(12) United States Patent
Clavadetscher

(10) Patent No.: US 7,428,482 B2
(45) Date of Patent: Sep. 23, 2008

(54) VISUALIZATION AND SETTING OF A VIRTUAL CAMERA AND LENS SYSTEM IN A COMPUTER GRAPHIC MODELING ENVIRONMENT

(75) Inventor: Charles Clavadetscher, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 618 days.

(21) Appl. No.: 10/957,063

(22) Filed: Oct. 1, 2004

(65) Prior Publication Data
US 2005/0091019 A1    Apr. 28, 2005

Related U.S. Application Data

(63) Continuation-in-part of application No. 09/276,883, filed on Mar. 26, 1999, now abandoned.

(51) Int. Cl.
*G06G 7/48* (2006.01)
(52) U.S. Cl. .......................................................... 703/6
(58) Field of Classification Search ....................... 703/6
See application file for complete search history.

(56) References Cited

U.S. PATENT DOCUMENTS

| | | | |
|---|---|---|---|
| 4,219,261 A | 8/1980 | Rosner et al. | |
| 4,731,864 A | 3/1988 | Modla | |
| 5,687,409 A | 11/1997 | Miyamoto | |
| 6,028,606 A | 2/2000 | Kolb et al. | |
| 6,081,670 A | 6/2000 | Madsen et al. | |
| 6,268,863 B1 | 7/2001 | Rioux | |

OTHER PUBLICATIONS

American Cinematographer Manual, American Society of Cineamatographers, Seventh Edition, 1993 by the ASC Press, Hollywood, CA, USA, cover, copyright, pp. 142-143, 152-157, 160-167, 180, 262-263.
Jerkins and White, "Fundamentals of Optics," 1954, McGraw-Hill Book Company, Inc., Chapter 4, "Thin Lenses," cover, copyright, pp. 44.
Fritz Lynn Hershey, "Optics and Focus for Camera Assistants," 1996, cover, copyright, Butterworth-Heinemann (Focal Press), Chapter 15, "Mathematics of Cinematography," pp. 183-184.
Douglas C. Hart, "The Camera Assistant—A Complete Professional Handbook," Butterworth-Heinemann (Focal Press), 1966, cover, copyright, pp. 405-406.

(Continued)

*Primary Examiner*—Hugh Jones
(74) *Attorney, Agent, or Firm*—Blakely, Sokoloff, Taylor & Zafman LLP

(57) ABSTRACT

A virtual camera and lens system in a three dimensional computer graphic modeling environment is set using a nominal focal length and a focus distance. A true focal length is calculated. An optical axis object that represents the optical axis of the virtual camera and lens system is created in the three dimensional computer graphic modeling environment. An object is attached to the optical axis at a location that visualizes the setting of the virtual camera and lens system as determined from the true focal length. The focal length of the virtual camera and lens system is set to the calculated true focal length. The focus distance and f-stop may be determined from near and far focus points.

13 Claims, 32 Drawing Sheets

OTHER PUBLICATIONS

David Samuelson, "David Samuelson's Manual for Cinematographers," 2nd Edition, 1994-1998, cover, copyright, published by Focal Press, pp. 322, 325-327.

Charles G. Clarke, Editor, A.S.C., "American Cinematography Manuel," 1980, published by A.S.C. Holding Corp.

"The RenderMan Interface Specification—Version 3.1," Sep. 1989 (with typographical corrections through May 1995), 55 pages total.

Potmesil et al., Synthetic Image Generation with a Lense and Aparture Camera Model,: ACM Trans. Graphics, pp. 85-108, Apr. 1982.

Rushmeier et al., "Comparing Real and Synthetic Images: Some Ideas About Metrics," Eurographics Rendering Workshop, 1995, pp. 1-9.

| Variable | | Name | Standard Units | Example Value |
|---|---|---|---|---|
| FL | = | Focal Length | millimeters | 50 mm |
| TFL | = | True Focal Length | millimeters | 50 mm |
| Ap | = | Aperture | thousanths of inch | 0.980" |
| Fs | = | F-Stop | (log values) | f5.6 |
| Coc | = | Circle of Confusion | thousanths of inch | 0.001" |
| Fo | = | Focus | Feet | 10' |
| Vfov | = | Vertical Field of View | degrees | 36 |
| Hfov | = | Horizontal Field of View | degrees | 52 |
| Hd | = | Hyperfocal Distance | feet | 50' |
| Hf | = | Hyperfocal Focus | feet | 25' |
| Ar | = | Aspect Ratio | (ratio) | 2.35 |
| Ff | = | Far Focus Value | Feet | 100' |
| FinFf | = | Final Calculated Far Focus | Feet | 100' |
| Inf | = | "Infinity" setting cut-off, | Feet | 100' |
| Nf | = | Near Focus Value | Feet | 3' |
| Clip Pos | = | Viewfinder Clips Position | Feet | 0.7' |

FIG. 6b

VISUALIZATION AND SETTING OF A VIRTUAL CAMERA AND LENS SYSTEM IN A COMPUTER GRAPHIC MODELING ENVIRONMENT

CROSS REFERENCE TO RELATED APPLICATIONS

This application is a continuation-in-part of application Ser. No. 09/276,883, filed Mar. 26, 1999, abandoned.

BACKGROUND OF THE INVENTION

1. Field of the Invention

The system and method of the present invention relates to three dimensional computer graphic modeling, and more particularly to setting and visualizing parameters of a virtual camera in a three dimensional graphic model to control later photorealistic rendering by a computer.

2. Background

The use of computers to generate photorealistic three dimensional images has become widespread. Computers frequently are used to generate and/or display three-dimensional images, pictures and moving images such as video and movies. Animation using the computer is quite common. These images are generated a variety of ways. For instance, an image may be computer generated through software executing on the computer. At other times real world images are imported from another media, such as film or a camera and lens apparatus electrically connected to the computer system. Computers also are being used to combine real world images and computer generated images.

Production of photorealistic images from three dimensional computer graphic models may be very time consuming, possibly taking several hours to produce a single image. The production of photorealistic images may be split into a modeling phase and a rendering phase. Artists may build and manipulate the graphic models in the modeling phase which may be optimized for real-time interaction. The modeling phase may produce a description of the scene that is passed to the rendering phase where the photorealistic images are produced without artist involvement.

The production of even a single photorealistic image may not be feasible in real-time. In particular, the generation of photorealistic moving images in real-time is extremely difficult. Artists preparing photorealistic three dimensional images often work with simplified representations of the scenes they are preparing. For example, an artist may work with wireframe models in which objects are represented by meshes of lines that only suggest the size and shape of an object. In other cases, previsualizations may be generated that show the appearance of objects but simplifying or omitting most of the subtle photographic effects to reduce the time and/or computing power required to generate the previsualization images. The fully rendered image is generated only after the scene has been completed based on the use of the simplified presentations of the computer model. Since the rendering of the final photorealistic three dimensional images may be time consuming and costly, it is desirable that the artists preparing the scene achieve the desired result before the final image is rendered.

A digitally simulated virtual camera may be part of the computer graphic model to control the rendering of the three dimensional model as a two dimensional photorealistic image. The rendering of a computer generated image may be controlled by the virtual camera. The virtual camera provides parameters such as position, orientation, and lens settings equivalent to the parameters of a physical camera and lens system. The rendering software may use some or all of the camera parameters to achieve photorealism of the final rendered images. For example, the rendering software may use the focus setting of the virtual camera's lens to determine what objects will be rendered in sharp focus and which will appear blurred to suggest being out of focus. The artist may adjust the parameters of the virtual camera—such as focus, focal length, and aperture—to achieve the desired photographic effect. It will be appreciated that all apparent optical effects of the virtual camera are entirely the result of computation performed by the rendering software and there are no real optical effects involved in the rendering process.

Modern photographic camera equipment and lenses contain a number of fixed and adjustable elements or parameters that may be modeled by the rendering software and affect the appearance of the final rendered images. The film gate (sometimes referred to as the aperture) represents a horizontal and vertical dimension of the image being exposed onto the photographic film or, in the case of the video camera, the size of the video image recording chip. The f-stop (sometimes also referred to as the aperture) on the lens controls the amount of light striking the film gate. The focal length of the lens identifies the distance from the rear nodal point of the lens to the surface of the focal plane. The focus represents a distance in front of the camera. The field of view is the area photographed by the lens and contains the images captured through the lens. The circle of confusion provides a measure of image clarity or sharpness of focus for a point. A camera typically has a focus ring to control focus from a setting of infinity to distances typically in the range of two to three feet. On a zoom lens a second control exists to manipulate the focal length.

The settings of these different features may be expressed using different scales and units. For example, the focal length typically is expressed in millimeters. The film gate (aperture) typically is expressed in thousandths of an inch. The actual film stock in the aperture typically is referred to in millimeters. The f-stop is a logarithmic scale based on light transmission through the lens. The focus is typically set in feet, or sometimes in inches or meters. The field of view is typically expressed as an angle of degrees either horizontal, vertical or diagonal. In addition, the relationship between the horizontal and vertical dimensions of the aperture, referred to as the aspect ratio, is represented as a single number assumed to be a ratio to a value of 1. Motion picture examples include 1.33:1, 1.66:1, 1.85:1, 2.20:1, 2.35:1. These typically are referred to as "1.33", "1.66", "1.85", "2.20", "2.35"; which represents how wide the format appears to be to the viewer in relation to the image height. In addition, the circle of confusion is typically measured in thousandths of an inch.

A typical 3D software modeling package does not provide a preview of the effects of virtual camera lens adjustments. Some 3D software modeling packages, such as those marketed by SOFTIMAGE, an Avid Corporation, Inc. company, provide control of the lens characteristics such as f-stop, focus, and the circle of confusion. However, the lens characteristics provided are used strictly for the creation of the photorealistic computer graphic image as the final step in the simulation process.

When objects are defined within a computer graphics software environment, a camera object is usually specified solely in order to provide a particular view of those objects. Since the system is an electronic simulation and does not use light rays or an optical system to capture and record the image, physical real world issues like focus do not come into play. Instead the images are viewed by the user on the computer system or recorded out to a picture file. For example, all objects in a preview computer graphics image may be shown as though all objects were in perfect focus.

For these reasons, computer graphics images are normally sharp during the interactive phase when the images are generated and combined with other images, as the images presented to the user during that phase do not take lens characteristics into account. Typically an attempt to simulate the effects of focus and other lens artifacts are applied as part of a separate and last rendering step in the creation of a final computer graphic image, i.e., subsequent to the interactive phase controlled by the artist.

The computer modeling environment used by the artist may not provide adequate feedback of lens values, or determinations of exact boundaries or locations of lens effects. Furthermore, the calculations typically used to derive the final field of view for a particular lens in a 3D modeling package contains assumptions, omissions, oversights and oversimplifications of the real world equivalent true lens and camera combinations. Most notable are the lack of solving for the effects of change in focus as it relates to focal length and the lack of equivalent controls compared to a real world camera. The relationship among lens attributes, such as focal length, focus and f-stop are not well understood or implemented in current software packages and do not successfully address the problems and details of simulating the changes in these optical characteristics. To appreciate this, consider that a nominal 100 mm lens focused at 2 ft. has a true focal length of nearly 120 mm.

Effects, such as the changing of focal length as a lens is focused, are obscured to the observer by the pronounced effects of blurring as the object goes in and out of focus. In the situation where matching a real world environment to a computer-generated object is not exact, the situation is oftentimes only fixed through trial and error and a user may need to guess tolerances and measurements as an approximation to regenerate a combined image multiple times to see what "looks best."

In addition, currently available 3D software modeling packages do not contain some of the features common to many real world cameras, such as interchangeable reference clips and direct and interactive control of focus, zoom values and depth of field. These missing elements constitute important technical considerations for getting the exact lens setting as close as possible to the settings of the real world camera and for being able to operate a computer graphics virtual 3D camera in the same manner and ease as a real world camera.

The virtual camera and lens system and method of the present invention addresses the setting and visualization of the settings, prior to rendering, of a computer graphic, virtual, three dimensional camera and lens model having the variables and features of a real world camera and lens device.

SUMMARY OF THE INVENTION

A virtual camera and lens system in a three dimensional computer graphic modeling environment is set using a nominal focal length and a focus distance. A true focal length is calculated. An optical axis object that represents the optical axis of the virtual camera and lens system is created in the three dimensional computer graphic modeling environment. An object is attached to the optical axis at a location that visualizes the setting of the virtual camera and lens system as determined from the true focal length. The focal length of the virtual camera and lens system is set to the calculated true focal length. The focus distance and f-stop may be determined from near and far focus points.

BRIEF DESCRIPTION OF THE DRAWINGS

FIG. 6a is a flow diagram illustrating the processes utilized in one embodiment of the system and method of the present invention and FIG. 6b is a table illustrating parameters and variables utilized.

FIG. 9b is one embodiment of a perspective view of the camera and lens parameters illustrated by FIG. 9a.

FIG. 10b provides a perspective view of FIG. 10a.

FIG. 11b shows a top view illustrating the field of view of one embodiment of the present invention illustrated b FIG. 11a.

FIG. 11c shows a camera view of a 3D reference chart and objects corresponding to FIG. 11a.

FIG. 12b is a top orthographic view of the parameters illustrated in FIG. 12a.

DETAILED DESCRIPTION OF THE INVENTION

The setting and visualization of a virtual camera and lens system of the present invention, in one embodiment, operates in a three dimensional computer graphic modeling environment to provide numeric and visual feedback of camera and lens parameters and to adjust the virtual camera so that later rendering will more closely match the results that would be produced by a corresponding real camera. The visualization system automatically updates related camera and lens parameters when changes are made to one or more camera and lens parameters such that the resulting renderings more accurately resemble the results produced by real optical systems. The invention provides numeric and 3D visual feedback of lens characteristics to help the user predict and visualize lens characteristics before rendering of the graphic model takes place. It also provides a visualization and presentation of lens data in an interactive fashion, including characteristics that are difficult or impossible to see in real world or typical computer graphic presentations.

Furthermore, the system of the present invention can determine camera and lens parameter values in an interactive fashion without requiring burdensome computations. Thus, the system is capable of receiving data to define a setting of a real camera and lens in the form used to set the real camera and then setting parameters of the virtual camera as required to provide a closely matching rendering. The system may be used to recreate and visualize a specific setting from a particular real camera and lens after an image to be matched has been captured through normal photographic or electronic camera and lens systems. Thus, computer generated images can be matched to real world images taken through a camera and lens device without the unsightly artifacts that occur when real world and computer generated images are combined using prior art systems that do not provide visualization of the effects of the settings of the virtual camera to allow the real and virtual cameras to have consistent settings.

In the following description, for purposes of explanation, numerous details are set forth in order to provide a thorough understanding of the present invention. However, it will be apparent to one skilled in the art that theses specific details are not required in order to practice the present invention.

Figure 1A:
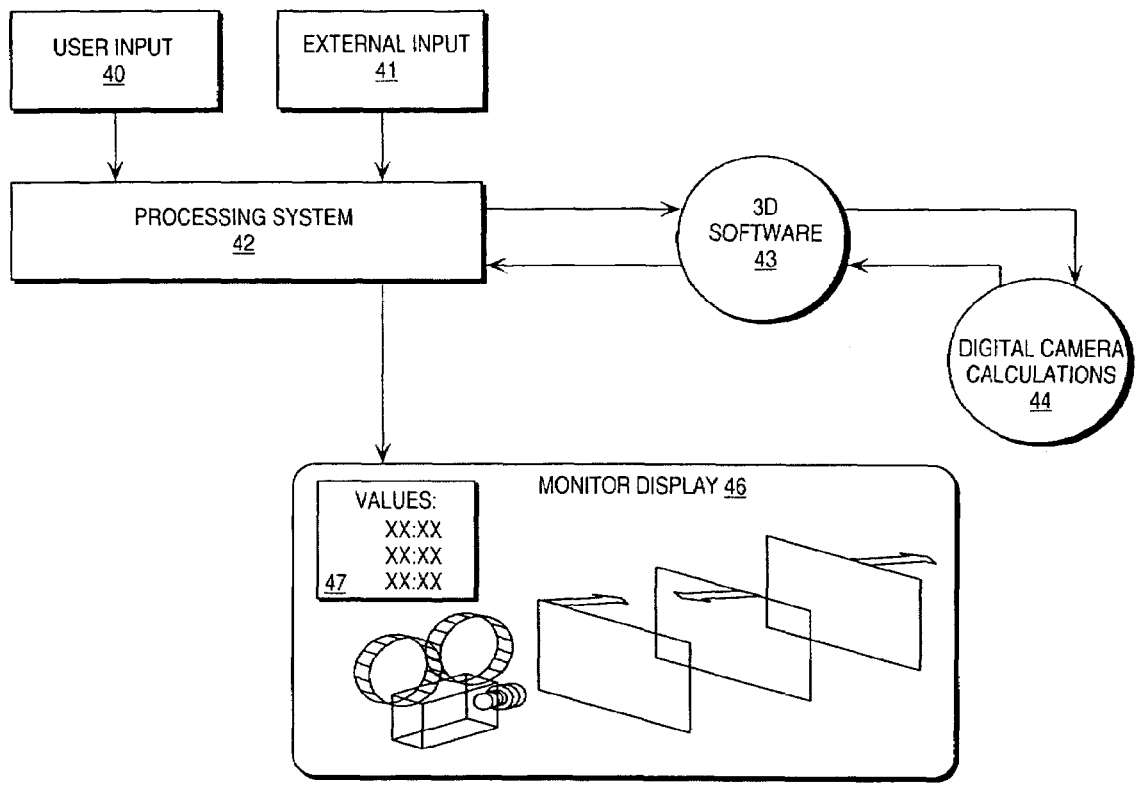
FIG. 1a is an overview of one embodiment of the system of the present invention.

An overview of one embodiment of the system of the present invention is illustrated in FIG. 1a. A processing system 42 receives input either through user input 40 or external input 41, such as may come from a camera and lens device. The system performs certain steps to provide numeric and/or visual feedback reflective of the lens and camera parameters of a virtual camera and lens as defined at least in part by the input. In one embodiment, the steps performed by the processing system are determined from instructions stored on media, such as a memory or storage device or received across a transmission media; these instructions are executed by processing system 42.

In the present embodiment, the digitally simulated camera software module 44 is interfaced with a three dimensional (3D) software modeling module 43 such as one produced by SOFTIMAGE, an Avid Corporation, Inc. company. Specially developed 3D software that generates 3D images on a display and the corresponding numeric values also may be used.

Figure 1B:
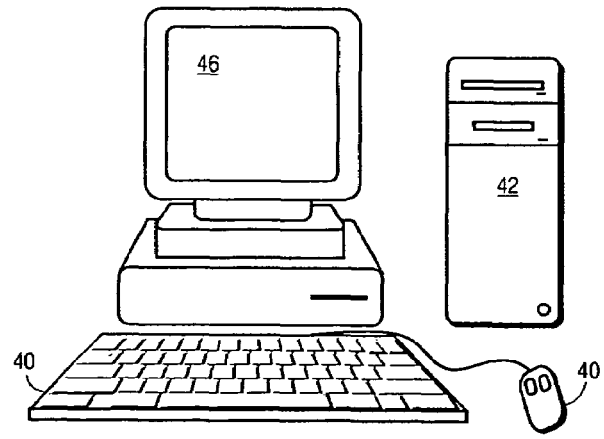
FIG. 1b is a simplified block diagram of a desktop computer system that operates in accordance with the teachings of the present invention.

The processing system 42 provides a monitor display 46. In one embodiment, the monitor display 46 is embodied in a desktop or notebook computer system, an example of which is illustrated in FIG. 1b, and provides images as seen through the digital camera and lens system as well as other views of the graphic model. The monitor display 46 may include values that indicate camera and lens parameters, which may include values set by the user and derived values determined from such settings.

Figure 2:
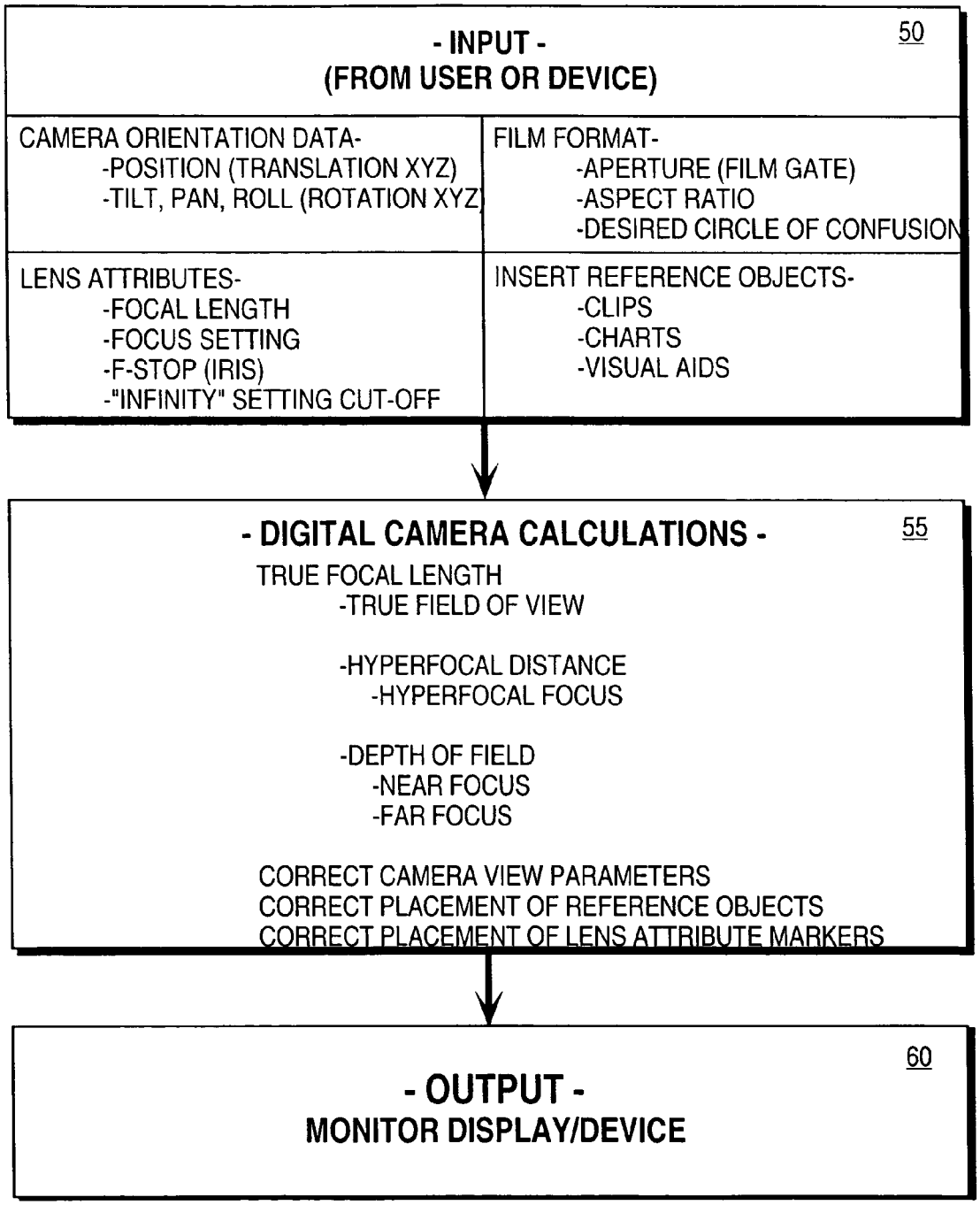
FIG. 2 is a flow diagram illustrating the input, computations and output of one embodiment of the method of the present invention.

FIG. 2 is a flow diagram illustrating further the operation of one embodiment of the system and method of the present invention. In particular, in the present embodiment, the input 50, which may be received from a user or from a physical device, may include such parameters as camera orientation data, lens attributes, film format and inserted reference objects.

For example, camera orientation input data may include the XYZ translational position of the virtual camera in space, as well as the pan, tilt and roll attributes of the virtual camera at any particular spatial position. The term "pan" relates to the y axis rotation of the camera, producing a horizontal sweep effect of a scene, a "tilt" relates to an x axis rotation of the camera, producing a vertical sweep of a scene, and "roll" relates to a z axis rotation, producing a rotational or spinning effect of a scene.

The camera film format input includes the film gate (aperture) size, which may be expressed as the width of the film gate, and aspect ratio, which is the ratio of the width to the height of the film gate. The lens attributes may include the focal length, desired circle of confusion, focus setting, f-stop and infinity setting cutoff setting. In addition, reference objects can be input, such as clips, charts and visual aids, to assist the user in performing filming functions. As will be explained below, as parameters are input and/or modified, other parameter settings are updated correspondingly to provide an indication of the effects of a realistic and accurate camera and lens system.

To provide this functionality, a number of calculations may be performed, such as shown in block 55, including true focal length, true field of view and hyperfocal distance, depth of field, near focus limit and far focus limit, aspect ratio, and film gate (aperture) setting.

A lens may be identified by a nominal focal length which is the distance from the middle of the lens to the point where parallel rays entering the lens will converge. When a lens is focused on an object at a finite distance in front of the lens, the lens is advanced away from the point of convergence. Thus the true focal length of a lens is a function of the focus distance with the true focal length being longer than the nominal focal length when the lens is focused to a finite focus distance.

Rendering engines calculate the two dimensional image that would result from "photographing" the three dimensional model using the modeled virtual camera. The rendering engine models many of the optical effects inherent in the virtual camera to produce a photo-realistic two dimensional rendering. When the rendering engine uses the nominal focal length to determine things such as field of view, depth of focus, and other rendered features that are affected by the focal length of the virtual lens, the rendering may not closely match the results that would be produced by a real camera and lens system having the same settings as the virtual camera. The focal length of the virtual camera may be dynamically set to the true focal length by the invention so that the rendering will more closely match the corresponding results that would be obtained from a real camera and lens system.

Depth of field represents the range of distances from the camera within which objects will be considered acceptable sharp for photographic purposes. Depth of field can be specified as a "near focus plane" and a "far focus plane" with the actual focus point itself being somewhere in between these two areas. Anything between these two planes will be considered "in focus" as defined by the circle of confusion setting, which defines the maximum acceptable size of a point source in the focused image.

Hyperfocal distance represents a special case of depth of field in which objects at infinity, as well as the nearest possible objects, are photographed with acceptable sharpness. When the lens is focused on the hyperfocal distance, the depth of field extends from half the hyperfocal distance to infinity. Therefore, if a lens is focused at the hyperfocal distance, all the image points between one-half the hyperfocal distance and infinity will not exceed a specific circle of confusion. One-half the hyperfocal distance is defined as the hyperfocal focus.

Correct horizontal and vertical angles of the field of view are determined from the true focal length. The system also uses the true focal length to determine correct placement of reference objects and correct placement of camera and lens attribute markers for display on a monitor or other device 60.

A real camera captures a two dimensional image of a three dimensional scene. In a real camera, the lens forms an optical image on the film plane. The film gate optically masks the outer part of the image so that a rectangular image is exposed on the film. In some real cameras the film gate may be larger than the portion of the image that will be used and the effective film gate is applied at a later point in the duplication of the camera footage. In other real cameras, anamorphic lenses may be employed to squeeze a wider image onto a narrower film frame. As used here, the term film gate or aperture is used to mean the effective film gate that represents the boundaries of the undistorted image that will be displayed in the final presentation.

In a real camera, a viewfinder is provided to show the camera operator the image that will be exposed on the film. The viewfinder may provide for insertion of a clip that shows the boundaries of the film gate of the camera. A clip is a reference object that indicates the outer boundaries of what will be included in the final rendered image as determined by the film gate (aperture). The viewfinder is designed to be optically equivalent to the film plane. Therefore the clip is optically equivalent to the film gate. If the viewfinder image is the same size as the image on the film plane, a common arrangement in real cameras, then the clip is a rectangle that is the same size as the film gate. All the optical effects that affect the image as formed on the film plane, such as changes in focal length, are accurately displayed in the viewfinder relative to the clip.

In a graphic modeling environment, the virtual camera is merely a representation of the parameters that will be used by the rendering engine to calculate a two dimensional image of the three dimensional scene created by the graphic model. The virtual camera does not provide a viewfinder. To provide the guidance of a clip in the viewfinder of a real camera, the invention may provide a clip in the form of a rectangular frame placed in the scene in a way that allows the relationship of the modeled scene to the boundaries of the final rendered two dimensional image to be visualized. As discussed below, the clip for the virtual camera must be adjusted as the virtual camera parameters are adjusted so that the clip always maintains the correct relationship to the scene as it will be rendered.

Reference objects are similar to clips. While clips show the outer boundary of the two dimensional image, reference objects show the position of objects within the two dimensional image. For example, if the images being generated by the computer graphic model are to be composited with existing live footage, there may be an object in the live footage that needs to interact with an object being modeled. A reference object may be created showing where the existing object is within the frame of the live footage. The reference object is then used to guide the placement of the objects in the computer graphic model so that the rendered footage will relate properly to the live footage. Reference objects have to be adjusted as the virtual camera parameters are adjusted in the same manner as clips so that the reference object always maintains the correct relationship to the scene as it will be rendered.

Figure 3A:
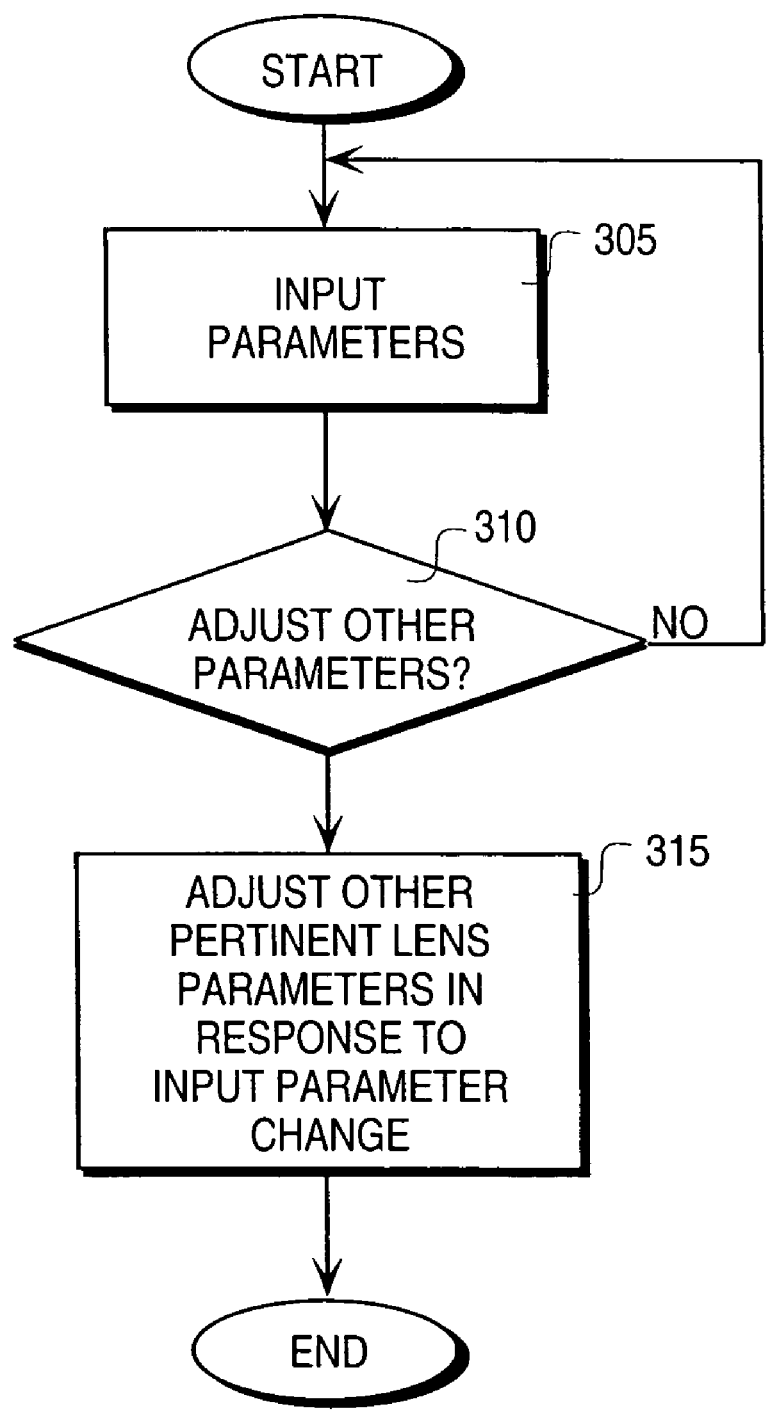
FIGS. 3a and 3b are simplified flow diagrams illustrating the embodiments of processes for adjusting camera and lens parameters in response to a camera and lens parameter changes.

FIG. 3*a* is a simplified flow diagram illustrating one embodiment of the method of the present invention. At step 305, camera and lens parameters are input. In the present embodiment, the parameters that can be input include those set forth in FIG. 2. The data input can be received from a device such as a real world camera and lens, a computer generated virtual camera and lens device, or a media device which stores or transmits input data values. A media device includes, but is not limited to, memory, data storage device, a computer system, external device, a user via a user input device (e.g., through keyboard or cursor control device and a graphical user interface), or a wired or wireless network including local area network and the Internet.

At step 310, if a change of a lens parameter is detected, such as a change of focus, then at step 315 other pertinent lens parameters are adjusted in response to the lens parameter change. As a specific example, in one embodiment, when the focus is changed there is a change in the true focal length of the lens. In turn, all the attributes that relate to the focal length are changed. These include the depth of field, the hyperfocal distance, the hyperfocal focus and the angles of field of view. In addition, objects used to indicate or locate these effects are also shifted accordingly. Alternately, if there is no change in input camera and lens parameters, or if an input parameter change does not offset other parameters, the process continues and is set to accept new input camera and lens parameter data.

Figure 3B:
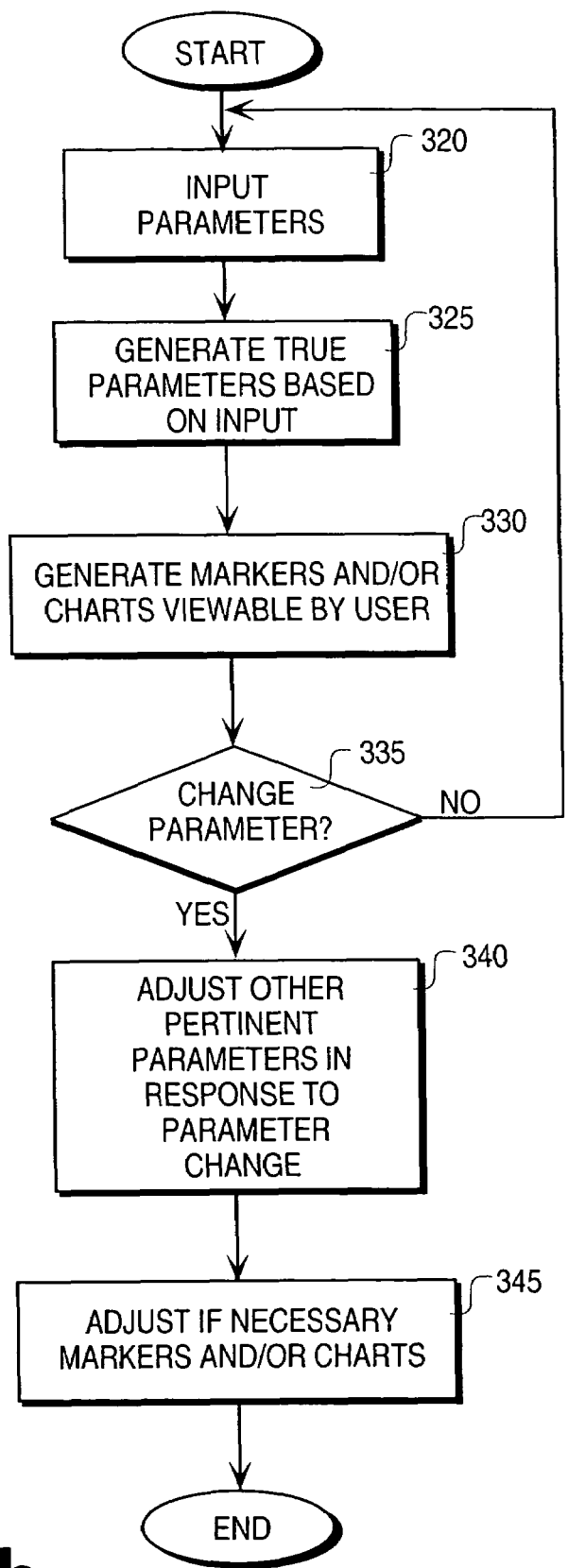

Another embodiment is illustrated in FIG. 3*b*. At step 320 camera and lens parameters are input. True camera and lens parameters are generated, step 325, based upon the input. Markers or charts can be enabled/input to the system to be viewed by the user, step 330.

These markers include markers defining near focus and far focus or other parameters such as the actual position of the hyperfocal focus, position of the hyperfocal distance, position of the focus itself and the position of the near and far limits of focus (depth of field). The system of the present invention may be configured to output these positions as distances or locations. Other types of markers and charts simulate the optically produced effects of mechanical or physical versions in a real camera as part of the comprehensive lens and camera simulation of the system of the invention.

Thus, if at step 335 a camera and lens parameter is changed, at step 340 pertinent camera and lens parameters are updated and at step 345 markers and charts are updated if necessary to provide a consistent view to the user such as would be viewed if a physical marker or chart is mechanically attached to a camera and lens device.

Figure 4A:
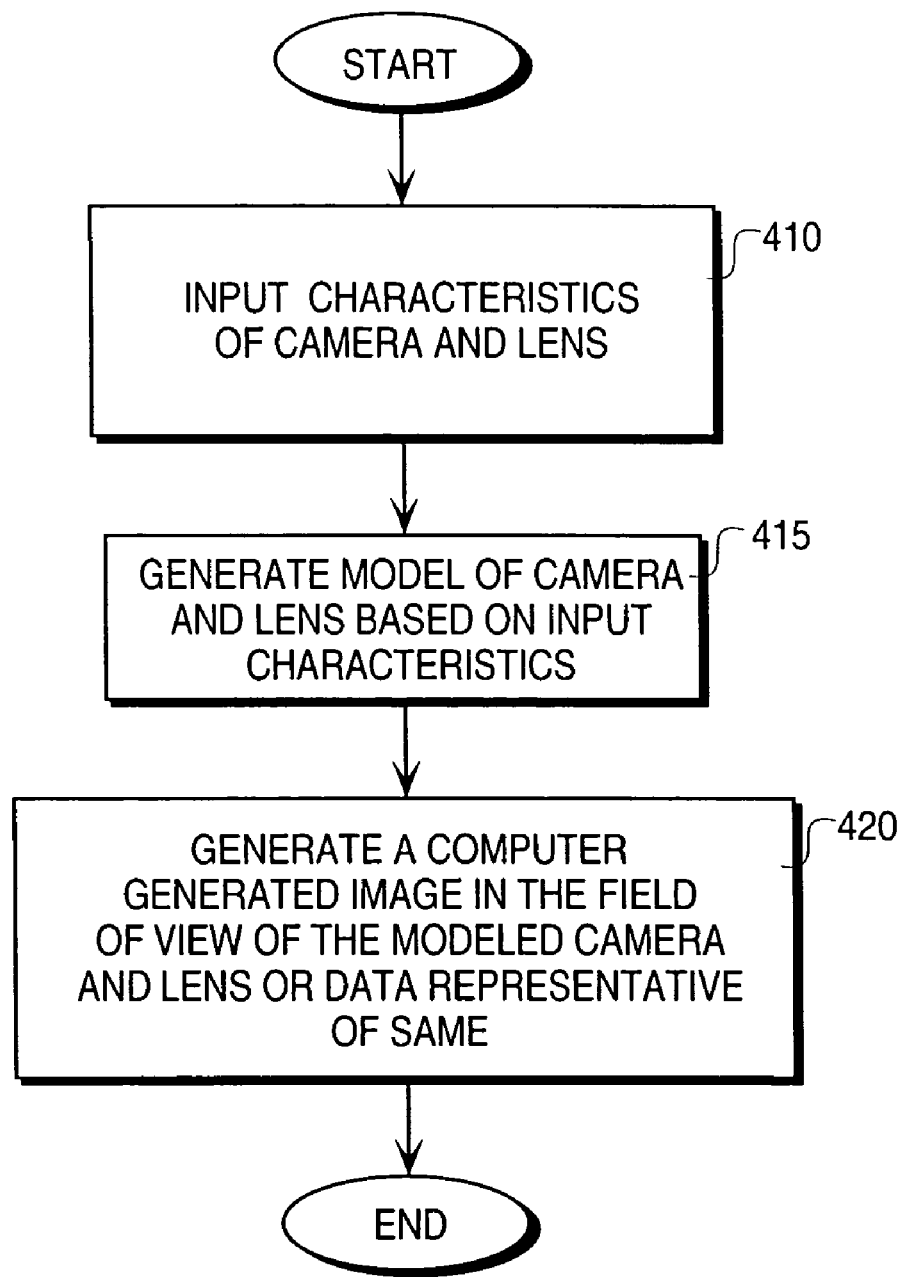
FIGS. 4a and 4b are simplified flow diagrams illustrating embodiments of a process for generating a computer generated image in the field of view of a camera modeled according to camera and lens characteristics of a real world camera and lens.

In another embodiment, as illustrated in FIG. 4a, a virtual camera can be modeled, enabling the simulation of a camera and lens system. At step 410, the characteristics of a camera and lens are input. This input may or may not be reflective of an actual real world camera and lens device. At step 415 a model of a digitally simulated model of the virtual camera and lens is generated based upon the input camera and lens characteristics. At step 420 a computer generated image in the field of view of the modeled camera and lens or data representative of the same is generated.

In this embodiment, the system can be used to compute camera and lens parameters while filming with a real camera for correct adjustment of the real camera and lens device for subsequent use in a computer generated camera and lens system, or to generate a true display of an image according to the camera and lens parameters input. In this situation, the system can be used to predict, visualize or define a situation with the camera and lens before actual photography takes place. Thus, the system eliminates guesswork and a search for proper values when looking through a viewfinder while providing instantaneous updates as values are changed.

Figure 4B:
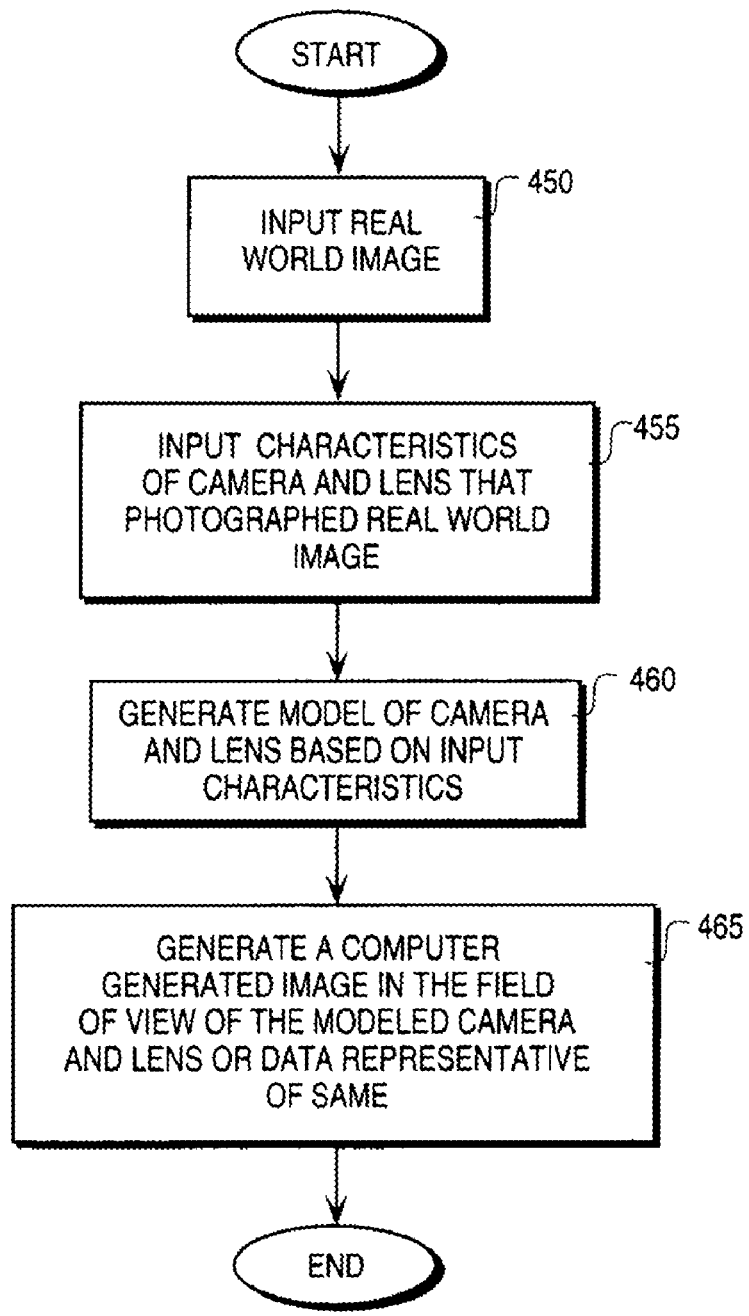

In another embodiment, as illustrated in FIG. 4b, the invention may be used after a real world image has been photographed with a real camera and lens system in order to better integrate the computer graphics generated by a virtual camera with real images captured by the real world camera, as well as duplicate properties of the real world camera and lens. At step 450, a real world image is input and at step 455 the lens and camera characteristics that photographed the real world image are input to the system. At step 460 a digitally simulated model of a camera and lens is generated based upon the input lens characteristics. At step 465 a computer generated image in the field of view of the modeled camera or data representative of the same is generated. In this embodiment, the system allows the virtual camera of the computer graphics modeling environment to more closely conform to the real world camera.

The system of the present invention also enables the animation of parameters that are typically not animatable. On a typical real camera and lens device, some parameters can be changed on a routine basis, for example, focus, while other things cannot be changed because of physical and mechanical limitations, such as the size of the film gate (aperture). Because the system of the present invention provides a simulated environment that is not constrained by mechanical physical limitations, it allows for the animation of parameters that typically are considered unanimatable.

At first glance, it would appear that such a feature would not provide any useful ability; however, during an image's life, the image may go through many processes, any one of which can cause the aperture or aspect ratio to change. The most typical situation would be if the film were scanned or digitized for being input to an image based software package. If the pictures are altered either through cropping or some other image processing technique, it would be possible to change the apparent aperture size or aspect ratio of the digitally simulated camera and lens using the system of the present invention. If these values are changing throughout the course of a motion picture shot, the system would cause an animating change in the apparent aperture and/or aspect ratio of the images. Thus, the system of the present invention provides the ability to animate these attributes accordingly to compensate for a change in aspect ratio or film gate pass necessary to correct artifacts that may result from such an unusual situation.

Figure 5:
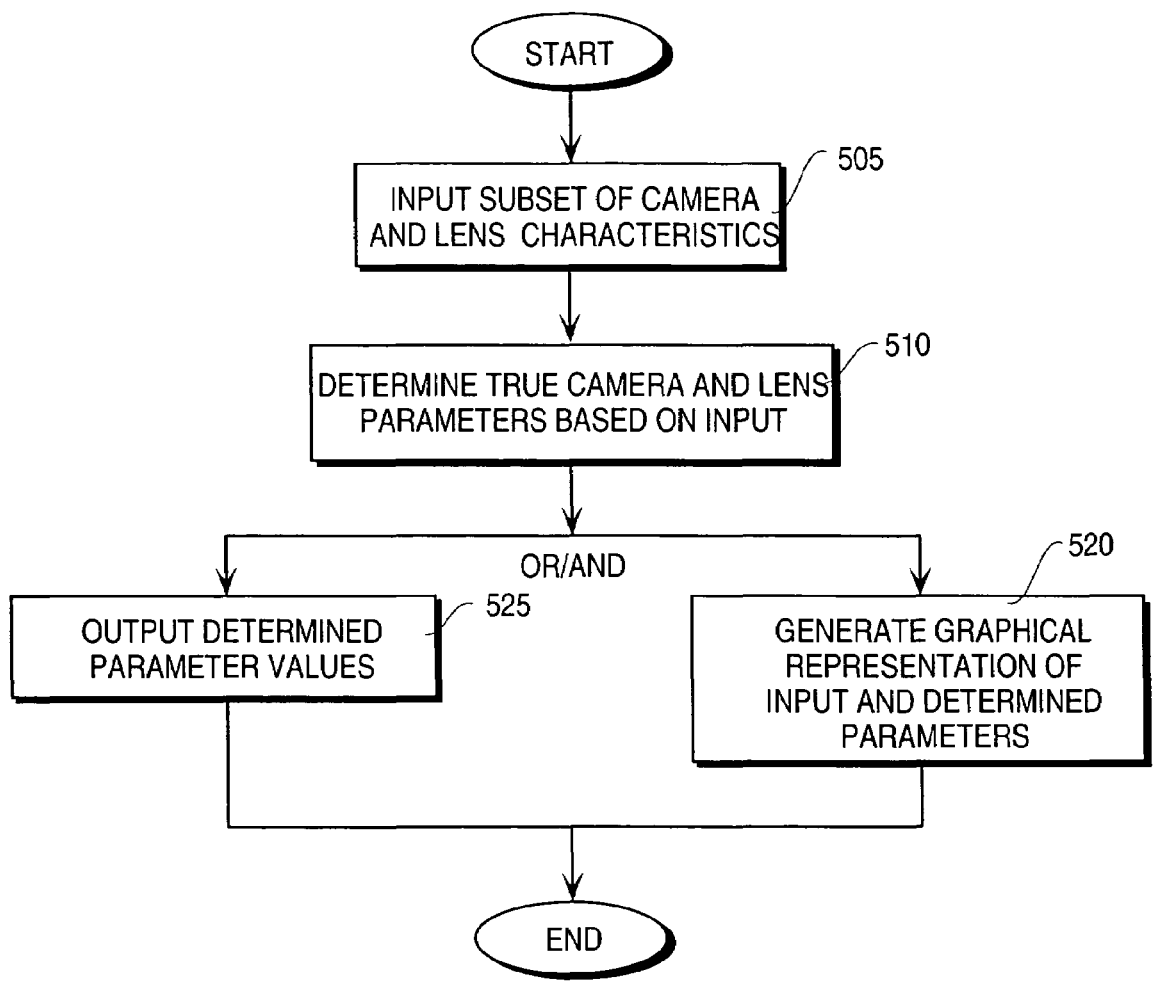
FIG. 5 is a simplified flow diagram of a process for determining camera and lens characteristics in accordance with the teachings of the present invention.

In addition, based on a portion of the lens parameters input, other lens parameters can be generated. This is illustrated in the flowchart of FIG. 5. At step 505, at least a subset of camera and lens parameters desired are input. At step 510, the true lens parameters are generated based upon the input.

In an alternate embodiment, the user or a device inputs a basic subset of parameters, which preferably are correct values, to initialize the process. Once the basic subset is input, the system is able to correct those lens and camera values based upon the relationship of the parameters to each other. Thus, for example, the system may correct a focal length for focus and adjust all necessary derived values, such as readjustment of the depth of field based on a new derived focal length determined from focus calculations. Therefore, based on the input, the system may adjust a parameter even though a value was input. As the camera and lens parameters of a real world device can be simulated by the process, the simulated camera and lens system can be matched to a physical camera and lens device.

At steps 520, 525, corrected data is output. In one embodiment, the numeric values are output, step 525, to a display, storage device or other output device or media. Alternately, graphical representations, as will be illustrated below in subsequent drawings, are generated, step 520. In an alternate embodiment, both numeric values and graphical representations are output, steps 525, 520.

Figure 6A:
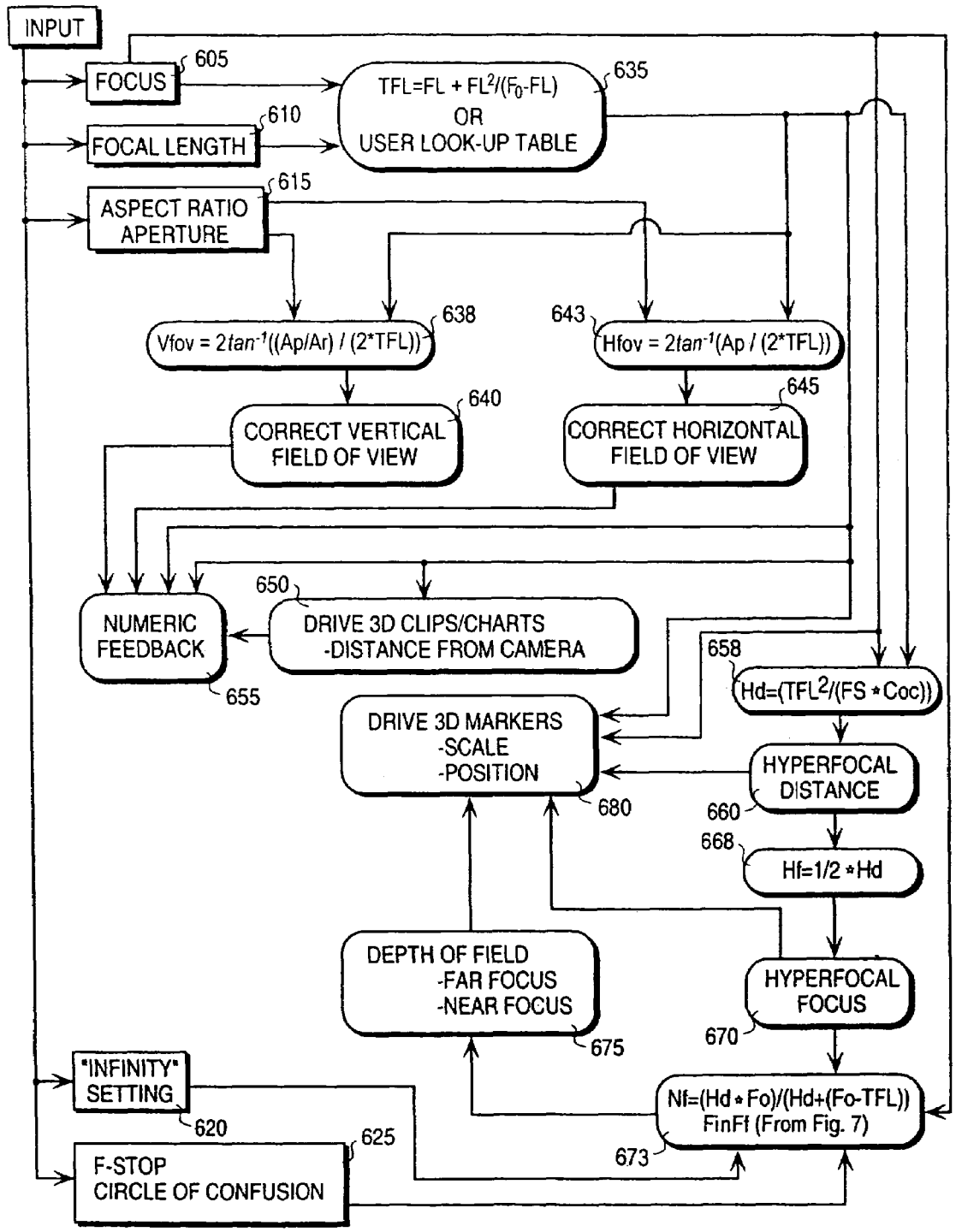

A more detailed flow diagram of the processes utilized in one embodiment of the present invention is illustrated in FIG. 6a. FIG. 6b is a table presenting a number of the variables that will be referenced in the following discussion. Referring to FIG. 6a, the input consists of focus 605, focal length 610, aspect ratio and film gate (aperture) values 615, infinity setting 620, f-stop and circle of confusion 625. Utilizing the focus 605 and focal length 610, the true focal length 635 is determined. The true focal length may subsequently be reflected as a number or graphically presented to the user as will be shown below. To determine the true focal length, a computation or a look-up table may be used, block 635. In one embodiment, the computation is as follows:

$$TFL = FL + FL^2/(Fo - FL)$$

where TFL represents the true focal length of the lens, FL represents the nominal focal length of the lens, and Fo is the distance at which the lens is focused, with all values being lengths in consistent units of measurement.

Using mathematical equations may be sufficient for some simple lenses. However, very complex lenses, lenses that are of special design, or even lenses that are out of alignment or unstable may require a measurement and mapping of basic lens properties from which look-up tables may be generated. This may occur, for example, when a particular type of lens and camera combination is required or some photography has been already shot with a particular type of lens in camera that was not in perfect condition. Furthermore, it is fairly common for the markings on a lens to be slightly off. For instance, the marks to indicate focus setting on a lens can be off by enough to cause an object to be out of focus if one were to only go on the lens markings and not look through the viewfinder. Even some lenses that are considered in "perfect" functioning condition simply do not operate according to the normal optical equations. There are a number of lenses, particularly zoom lenses and those designed for microscopic or macroscopic photography whose design is fundamentally non-linear. In these cases, changing lens attributes such as focus or the focal length (on a zoom lens) have unpredictable results. Thus, some mechanism needs to exist to adjust the recorded values so the values correspond to the true optical properties of the lens. A look-up table provides a mechanism for incorporating those lens peculiarities into the invention's calculations to correct for these abnormalities.

One advantage to the look-up table is that the table can provide for non-linear lens characteristics of a particular camera and lens device, thus enabling the system to better match a particular camera and lens device. The look-up table in one embodiment may be empirically determined. For example, a look-up table may be configured as follows to include empirically determined information:

| mark | true focal length | focus |
|------|-------------------|-------|
| 1    | 50.2551           | inf   |
| 2    | 50.7630           | 25    |
| 3    | 51.1501           | 15    |
| 4    | 51.55             | 12    |
| 5    | 51.9124           | 9     |
| 6    | 52.15             | 7     |
| 7    | 52.683            | 6     |
| 8    | 52.8815           | 5     |
| 9    | 53.7263           | 4     |
| 10   | 54.16921          | 3     |
| 11   | 55.87176          | 2.5   |
| 12   | 57.136            | 2     |

A look-up table may be generated by typically sampling or measuring the changes in focus and focal length over a range of settings. Interpolation between these measured values is performed to produce correct lens values between the measured points. These values may then be used to provide a more accurate readout of the resulting changes.

A correct vertical field of view 640 and horizontal field of view 645 are determined using the aspect ratio and aperture size 615. Thus, in one embodiment, the following computations are performed to determine the correct horizontal and vertical fields of view.

$$Vfov = 2\tan^{-1}((Ap/Ar)/(2*TFL)) \qquad 638$$

$$Hfov = 2\tan^{-1}(Ap/(2*TFL)) \qquad 643$$

where Vfov represents the vertical field of view, Hfov represents the horizontal field of view, $\tan^{-1}$ represents an arctangent function, Ap represents the aperture size, Ar represents the aspect ratio and TFL represents the true focal length. The arctangent function may be performed using a lookup table of values.

The invention may provide clips which serve the same purpose as clips placed in the viewfinder of a real camera. The virtual clip provided by the invention may be a rectangle placed in the 3D graphic modeling environment attached perpendicularly at the center of the rectangle to the optical axis of the virtual camera. The rectangle of the virtual clip has the same aspect ratio as the film gate and a clip width, which may be the same size as the film gate aperture of the camera.

The invention may also provide reference objects which are 2 dimensional objects that define points of reference within the film gate aperture. The reference objects may be placed on the same plane as the clip and located relative to the clip rectangle. The reference objects may be the size that they will appear in the final rendered image or in a proportional size. It may be convenient to keep the proportional relationship between reference objects and their size in the final rendered image the same as the proportional relationship between the rectangle of the virtual clip and the size of the film gate. If the same proportions are used, reference objects will appear in the same plane as the clip. There may be situations where reference objects and the clip do not use the same proportion. In these situations the reference object and the clip will be in different parallel planes, all of which are attached perpendicularly to the optical axis of the virtual camera.

The clip and the reference objects are placed at a distance from the virtual camera that is varied as the parameters of the camera are adjusted so that the view from the point of view of the virtual camera provides the same visual effect as clips and reference objects in the viewfinder of a real camera. If the clip rectangle is the same size as the film gate aperture, then the clip must be placed the same distance in front of the nodal point (optical center) of the camera lens as the distance from the nodal point to the film plane. This distance is the true focal length. Therefore a clip that is the same size as the film gate is positioned according to the following formula:

$$\text{Clip Pos} = TFL/25.4$$

where Clip Pos represents the distance from the camera in inches and TFL represents the true focal length in millimeters. Using the true focal length 635 determined, three dimensional clips or charts 650 can be placed a certain distance from the camera and subsequently can be consistently located regardless of other changes to lens parameters. This information is used to provide visual feedback 650 to the user in the form of a graphical display of an image with the three dimensional clips and charts superimposed over the image relative to the particular field of view determined or lens parameter values 655.

A clip that is proportionally sized is positioned according to the following formula:

$$\text{Clip Pos} = (TFL/25.4)*(\text{Clip Width}/Ap)$$

where Clip Width represents the width of the clip in inches and Ap represents the width of the film gate aperture in inches. In one embodiment, the clips are one inch in width and positioned according to the following equation:

$$\text{Clip Pos} = (TFL/25.4)/Ap$$

Reference objects are positioned in front of the camera as distances determined as described above except that the proportion between reference objects and their size in the final rendered image is used:

$$\text{Ref Pos} = (TFL/25.4)*(\text{Ref Width}/\text{Img Width})$$

where Ref Pos represents the distance from the camera in inches, TFL represents the true focal length in millimeters, Ref Width represents the width of the reference object in inches, and Img Width represents the width of the reference object image in inches.

The hyperfocal distance 660, is determined from the focus value 605 input, the circle of confusion 625, and the true focal length 635 determined. In one embodiment, the hyperfocal distance may be determined according to the following:

$$Hd = (TFL^2)/(Fs*Coc) \qquad 658$$

where Hd represents the hyperfocal distance, TFL represents the true focal length, Fs represents the f-stop, and Coc represents the acceptable diameter of the circle of confusion.

Using the hyperfocal distance 660, the hyperfocal focus may be determined as:

$$Hf=Hd*0.5 \qquad 668$$

The hyperfocal distance 660 is used to determine the depth of field 675, in particular, far focus and near focus. In one embodiment, the far focus and near focus is determined as follows:

$$Nf=(Hd*Fo)/(Hd+(Fo-TFL)) \qquad 673$$

$$Ff=(Hd*Fo)/(Hd-(Fo-TFL)) \qquad 725 \text{ (FIG. 7)}$$

where Nf represents the near focus, Ff represents the far focus, Fo represent a focus distance, Hd represents the hyperfocal distance, TFL represents the true focal length.

It is possible to calculate a hyperfocal distance from a near focus, a far focus, and a nominal focal length:

$$Hd=((FL/Nf)+(FL/Ff)-2)/((1/Ff)-(1/Nf))$$

where Hd represents the hyperfocal distance, FL represents the nominal focal length, Nf represents the near focus, and Ff represents the far focus. This may allow the focus and f-stop to be approximately set by setting the desired near and far focus points:

$$Fo=(Hd-FL)/((Hd/Nf)-1)$$

$$Fs=(FL*FL)/(Hd*Coc)$$

where Fo represent a focus distance, Fs represents the f-stop, and Coc represents the acceptable diameter of the circle of confusion.

The f-stop setting can be set more exactly by using the Fo determined from the near focus, the far focus, and the nominal focal length to determine the true focal length (TFL) as previously described. The true hyperfocal distance (THd) is then determined from the TFL:

$$THd=((TFL/Nf)+(TFL/Ff)-2)/((1/Ff)-(1/Nf))$$

This may allow the focus and f-stop to be more exactly determined:

$$Fo=(THd-TFL)/((THd/Nf)-1)$$

$$Fs=(TFL*TFL)/(THd*Coc)$$

A computer graphics environment is not typically bounded by the normal constraints of the physical real world. Therefore, an object can be of nearly any size and any distance from the camera. However, this can lead to problems when dealing with objects or calculations that can often go to infinity such as the focus characteristics.

For example, a number of situations arise where a particular focus setting and f-stop yield a far focus setting that is essentially set at infinity. This causes the far focus marker to shoot off to some astronomical distance from the camera in a simulated camera program; this is neither desirable nor does it provide any valuable information. In addition, some 3D software programs include a feature that automatically shifts the view or camera so all objects are in frame at one time. Thus, if an object is off at infinity, the top view in the three dimensional software will also scale back to an astronomical distance in order to try and "see" all the objects at once.

Unfortunately, if this happens, these view cameras move so far away that even large objects turn into small specs on the screen. The resultant effect is that valuable information is lost as the view moves back to include the far focus marker which is far away. Thus, in one embodiment of the system of the present invention, the user is able to "set infinity". The setting for infinity defines the far bounds of the area interest. The user can work at a reasonable scale with a user defined boundary or area while still gaining all the benefits of the mathematical calculations and feedback from the markers within that bounded area.

This feature is valuable in a variety of situations, but it is particularly valuable when dealing with simulations, miniatures and models where the area of concern is very small. In this case, seeing all the markers requires careful setup of side, top and front views of the camera and focus marker positions and having a setting for infinity helps preserve these views. Using the infinity setting allows a Final Far Focus (FinFf) to be calculated that may be used in place of the true far focus (Ff) to avoid the undesirable effects of placing markers too far from the virtual camera.

Figure 7:
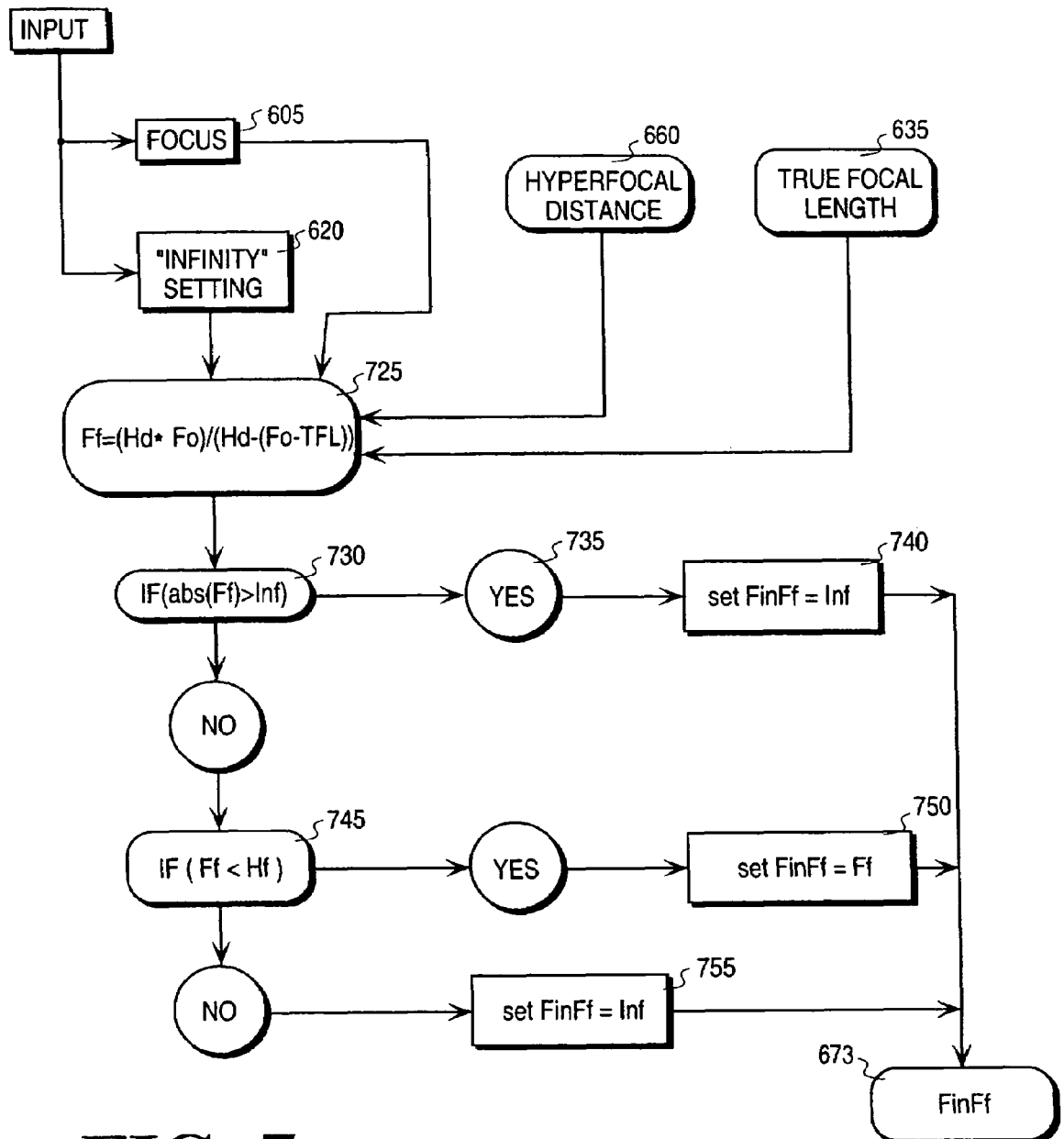
FIG. 7 is a flow diagram that illustrates the infinity cutoff decision process in one embodiment of the system and method of the present invention.

One embodiment of the process for determining the Final Far Focus is illustrated in FIG. 7. The infinity setting 620 may be a single number set by the user in order to define the limits of the area of interest from the camera as a base point. Therefore, if the user sets the infinity setting to 10 feet, then all reference objects controlled by the invention will be restricted to movement within 10 feet of the camera. No markers or other objects controlled by the invention will be allowed to go beyond 10 feet in any direction from the camera. If the user decides to change the infinity setting to 100 feet, everything is recalculated and all markers controlled by the invention will be restricted to a placement within 100 feet of the camera. This allows the user to restrict the invention's markers to a desirable range in order to limit their movement.

Using the focus (Fo) 605, infinity setting 620, the hyperfocal distance 660 and true focal length 635 an initial far focus (Ff) may be determined:

$$Ff=(Hd*Fo)/(Hd-(Fo-TFL)) \qquad 725$$

If the far focus exceeds the infinity setting 735, then the far focus is set to the infinity setting value 740. If the far focus does not exceed the infinity setting and the far focus is less than the hyperfocal focus 745, then the final calculated far focus value (FinFf) is set to be equal to the far focus value 750. Otherwise, the final focus value is set to the infinity setting 755.

Embodiments and uses of the present invention will be explained using the following figures. In one embodiment of the system of the present invention, it is contemplated that the values determined are generated as numerical values for a simplified presentation. In other embodiments, a graphical display is generated; sample graphical display images are illustrated in the following figures.

Figure 8A:
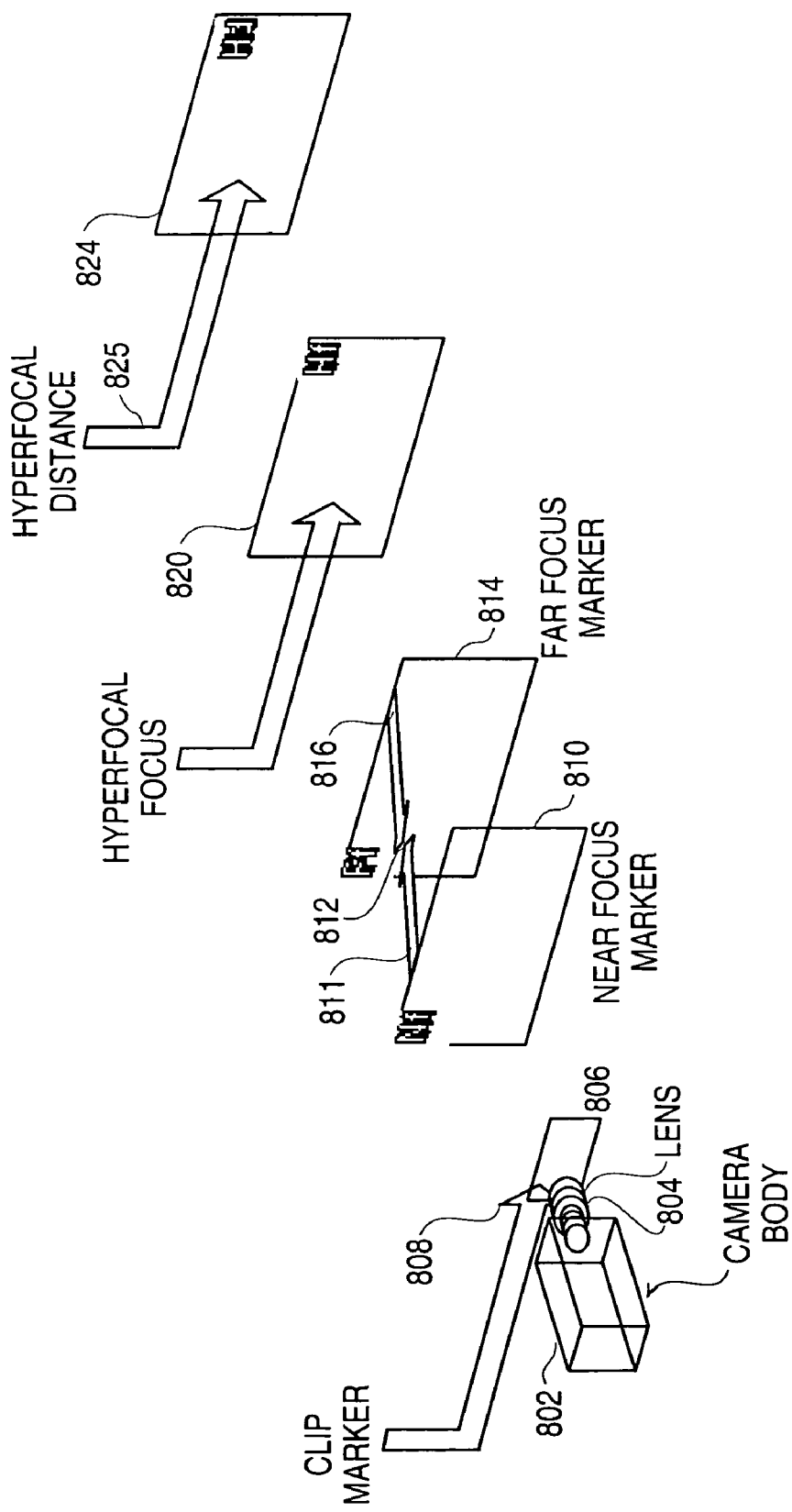
FIG. 8a is a perspective view illustrating one embodiment of the components of camera and lens system in accordance with the teachings of the present invention.

Referring to FIG. 8a, a three dimensional perspective view of basic camera and lens parameters is illustrated. The current view includes a camera body 802, and lens 804. Immediately in front of the lens is a small rectangle 806; an arrow 808 points to the center of the rectangle 806. This is a 3D reference marker which is viewed by the camera 802. In this embodiment, the 3D reference marker includes the numbers "2.35" which indicate that it is a 2.35 aspect ratio marker. The larger rectangle 810 is the near focus marker which identifies one end of an acceptable focus towards the camera. In the one embodiment, the letters NF (near focus) are associated with the rectangle both horizontally and vertically for easy reference. Beside the letters and on top of the near focus marker rectangle, there is an arrow 811 pointing to the actual focus point setting 812. The tip of the arrow is exactly at this point of focus. Also included is a far focus marker (FF) 814. This is similar to the near focus marker that defines the other end of acceptable focus towards the camera, and also includes an arrow 816 which points to the actual focus point 812. It should be noted that although the two arrows 811 and 816 are slightly offset from each other, they both point exactly to the same place in space, the actual user set point of focus 812. The values for the near focus marker and far focus marker are calculated from this point 812. Also illustrated is a hyperfocal focus point 820. In addition, another arrow 825 points to the location of the hyperfocal distance 824.

In one embodiment of the system of the present invention, these markers may be instantly updated whenever an associated lens or camera parameter changes. For example, the markers will change with corresponding changes in f-stop or focus. Thus, the markers will shift towards the camera or away from the camera appropriately and can be viewed from a variety of angles, either through the camera or from another point of view.

Figure 8B:
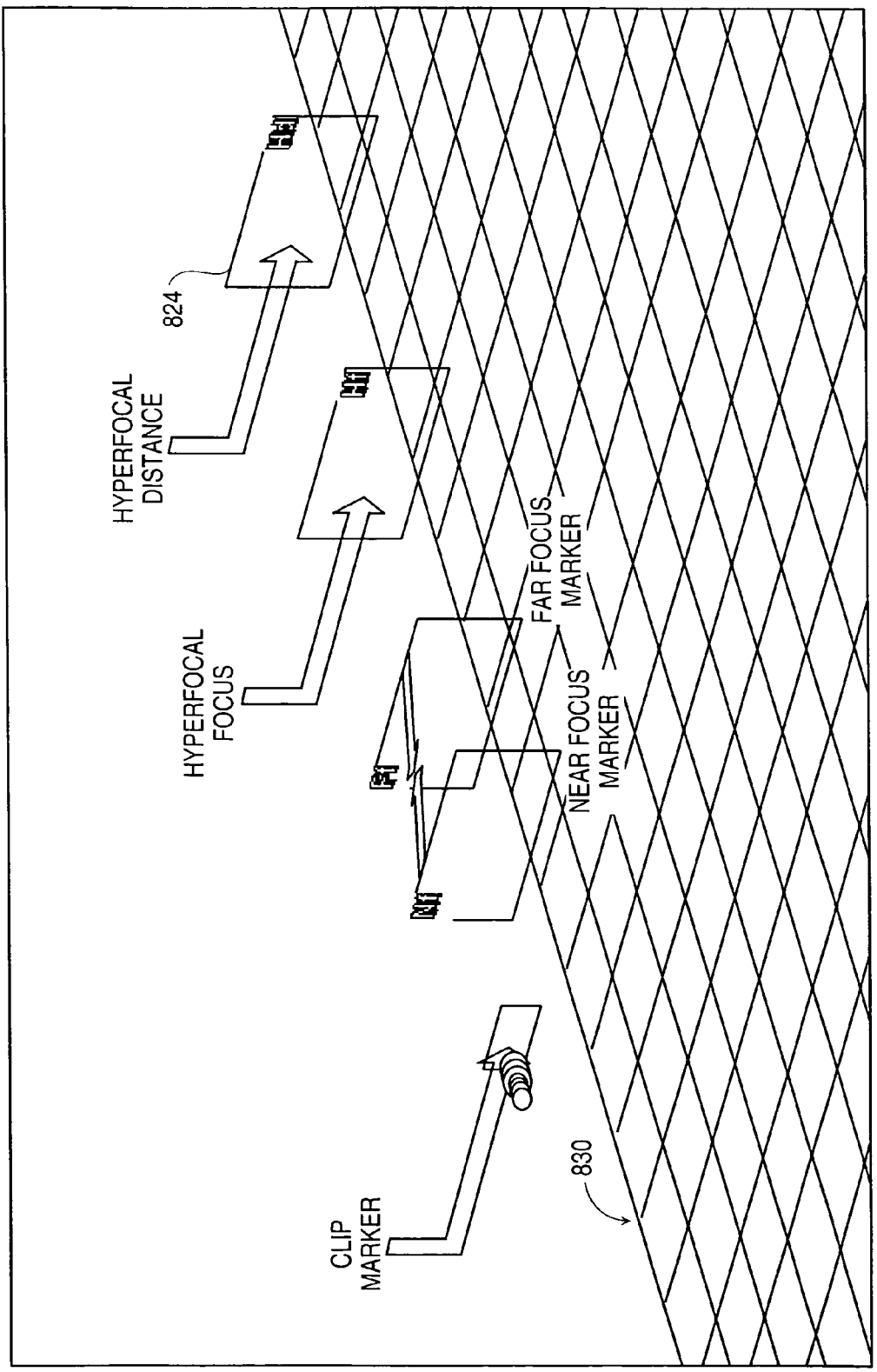
FIG. 8b is a perspective view illustrating one embodiment of the components of the camera and lens system of the present invention.

FIG. 8*b* shows the same scene as FIG. 8*a*, but the camera body has been removed and a reference grid 830 has been placed on the floor. For purposes of discussion, the grid illustrated in the Figures is included as a visual guide to better orient the viewer's perspective, to note the changes in the position of the markers as various lens parameters are changed, and to help understand the 3D relationship of the camera, lens and marker objects as shown in the different views.

In the embodiment illustrated by FIG. 8*b*, the camera markers are attached to the camera and travel with the camera; therefore, no matter what direction the camera faces, or where it moves, the markers stay in correct orientation to the camera and lens.

Figure 8C:
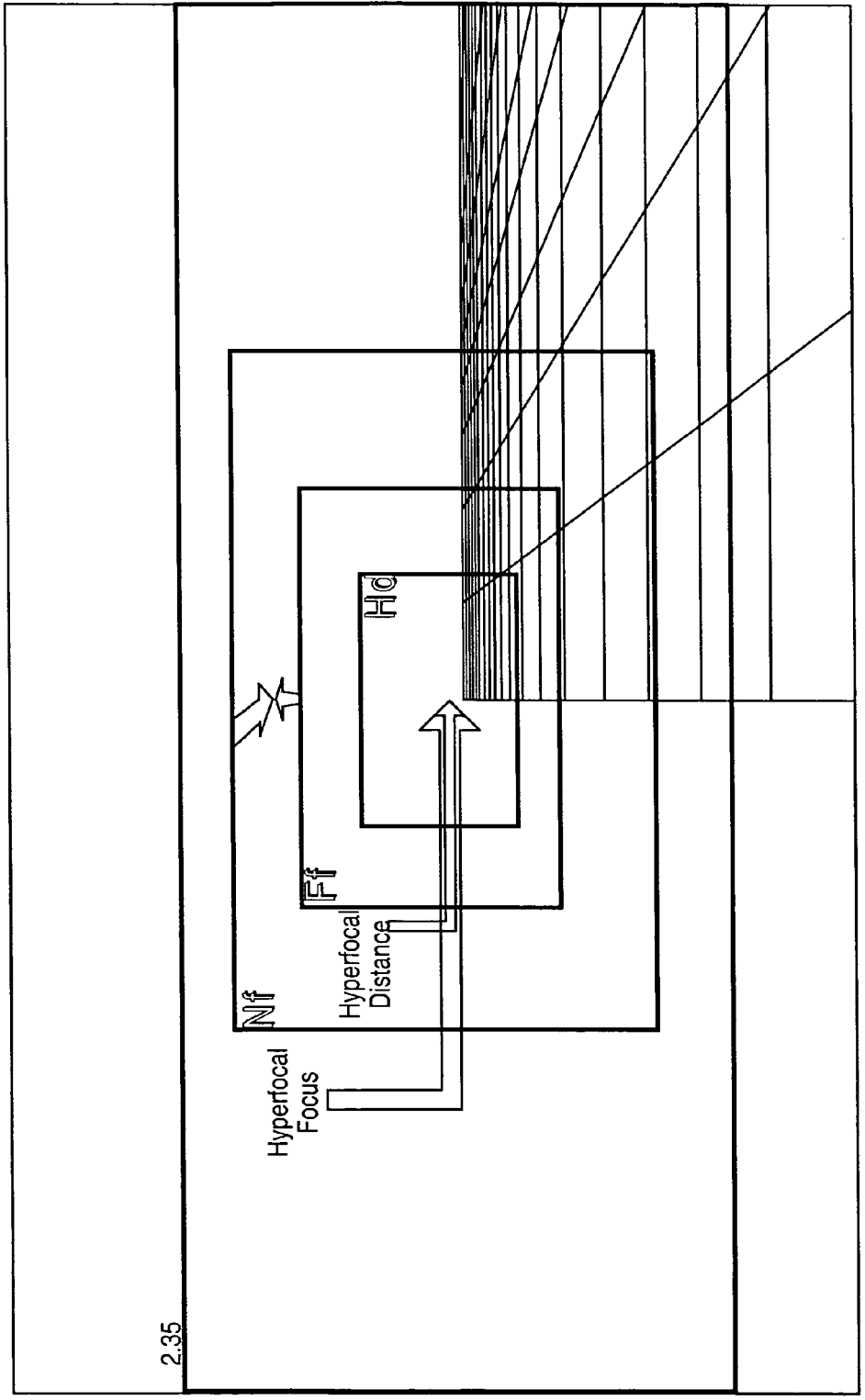
FIG. 8c is a camera lens point of view showing the different camera and lens parameters in one embodiment.
Figure 8D:
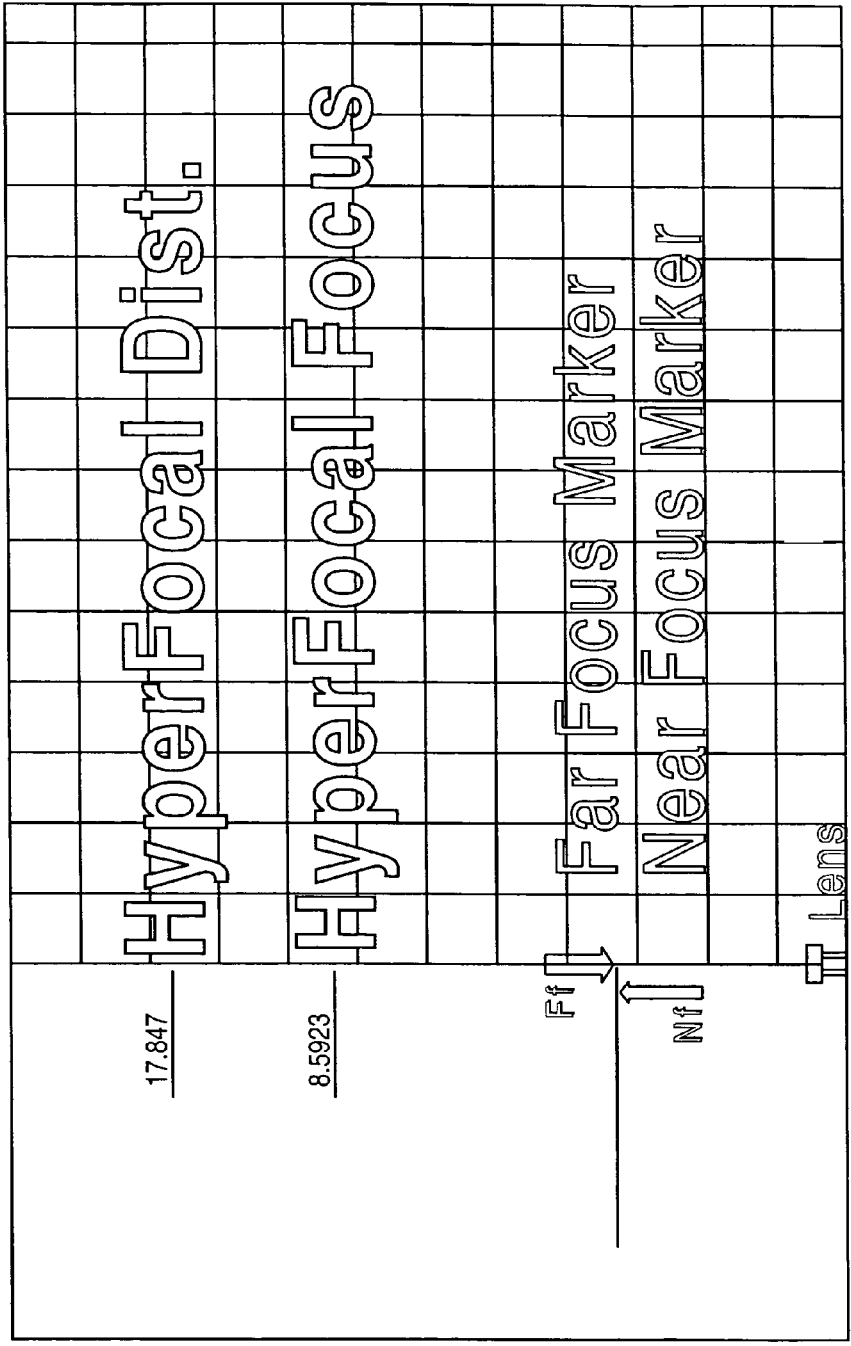
FIG. 8d is a top view illustrating the camera and lens parameters in one embodiment.

FIG. 8*c* shows the camera point of view for the scene of FIGS. 8*a* and 8*b*. It should be noted that the aspect ratio or marker (2.35) is centered in the lens' field of view, whereas the depth of field is defined by the near focus and far focus markers. A top orthographic view can also be generated in the present embodiment. This is illustrated in FIG. 8*d*.

FIGS. 8*a*-8*d* show the same scene from three different view points. In this example, the user has set the focal length to 19 mm and the focal distance is set to four feet with an f-stop of f2.8. Because focus affects focal length, the focal length, in accordance with the teachings of the present invention, has been recalculated to the true focal length of 19.3008 mm. The values for the hyperfocal distance, hyperfocal focus, near focus, far focus and the 3D reference chart position also are calculated to provide the correct relationship among the parameters.

Figure 9A:
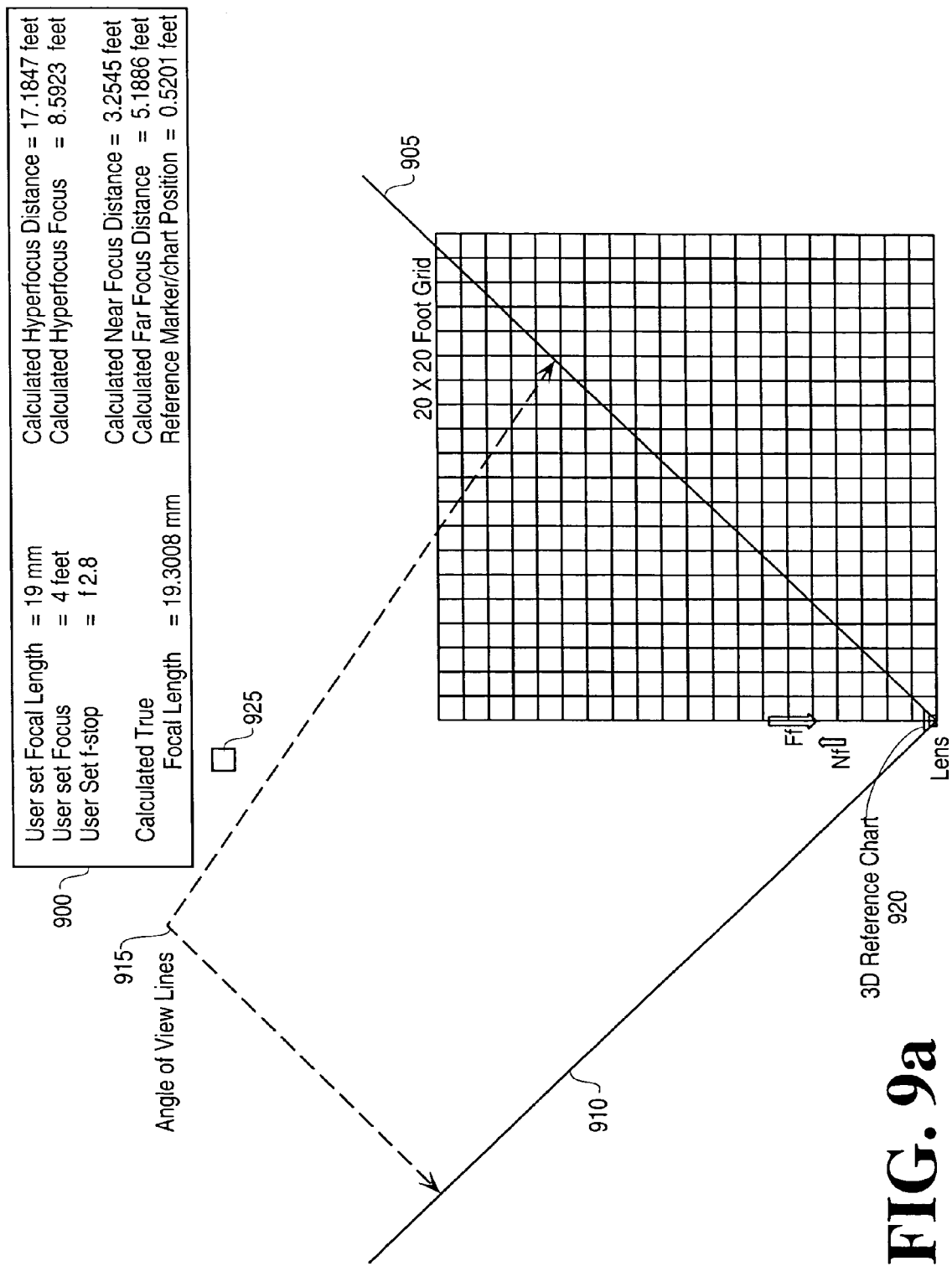
FIG. 9a is one embodiment of a top view illustrating the field of view of a camera and lens system in accordance with the teachings of the present invention.

FIG. 9*a* shows a wide scale top view with special reference lines to indicate the actual camera field of view 905, 910. The angle of view lines 915 represents the exact edges of the camera's view. It should be noted that the 3D reference chart 920 exactly fits in the angle view at its distance from the lens. The chart does not extend beyond the angle of view lines, and does not fall short of the angle of view lines. The chart's three dimensional position from the camera is calculated to fit exactly in the field of view so that the reference charts always stay visually in the same place when viewed through the lens even though the lens values are changing. Thus, the chart is moved to compensate and maintain an exact steady position relative to the camera field of view such as a physical chart would do when physically attached to a camera and lens device.

A one foot by one foot cube 925 is placed in the distance for comparison with other camera points of view. In FIG. 9*c* the focal length is very short (e.g., a wide angle lens is used). Thus, the cube 925 appears very small.

Figure 9B:
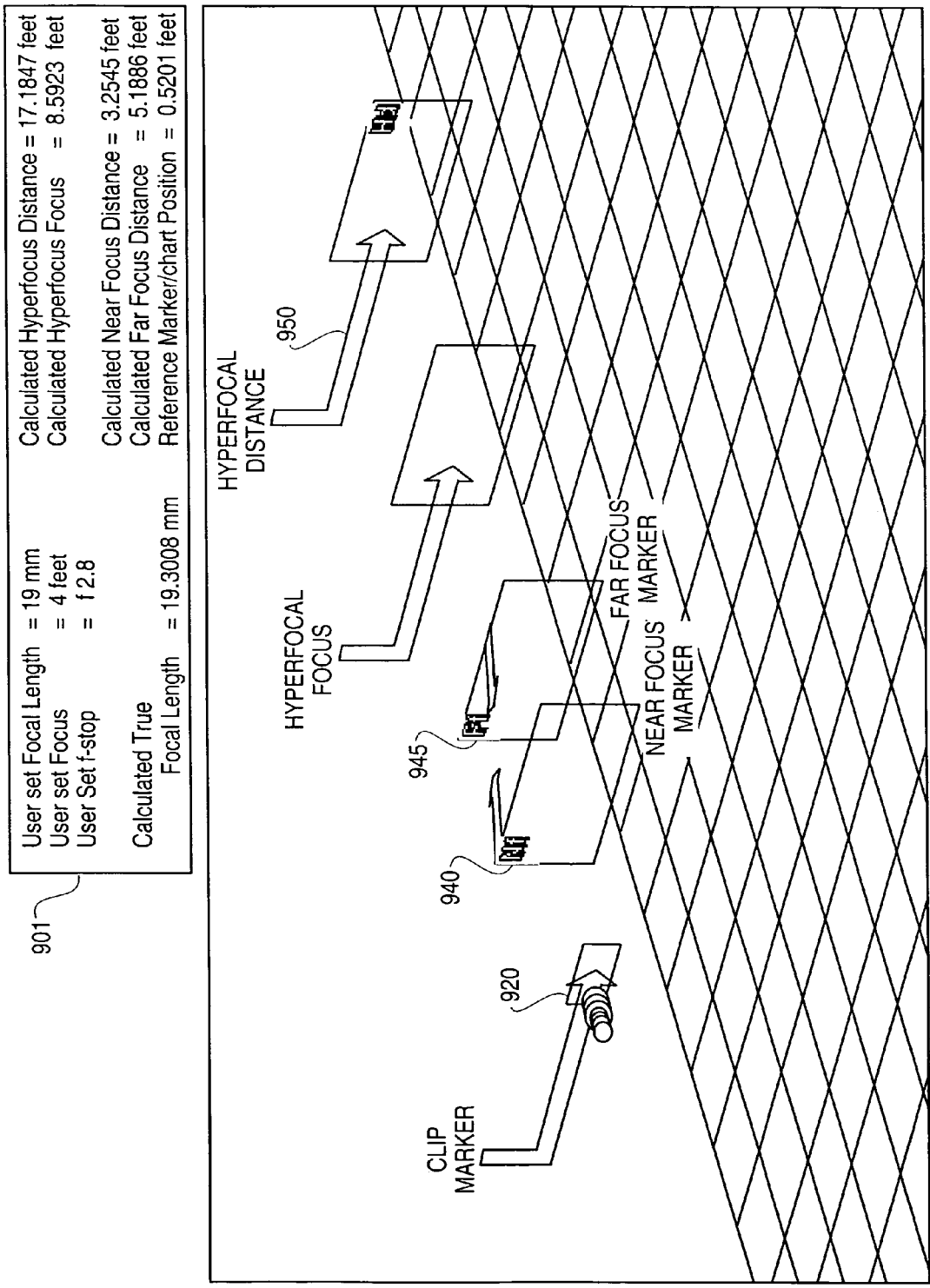
Figure 9C:
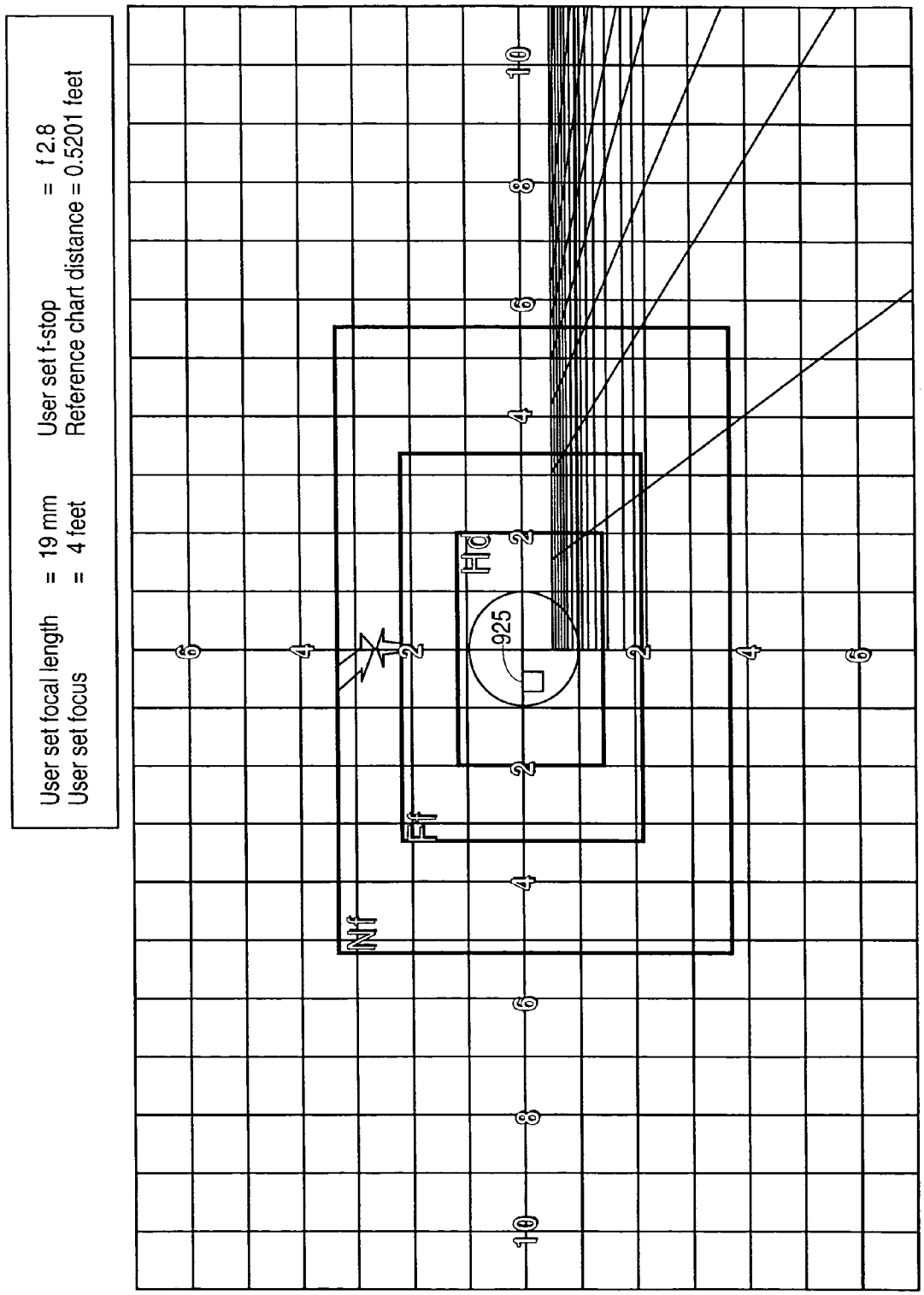
FIG. 9c is one embodiment of a camera view with superposed 3D charts and objects in accordance with the teachings of the present invention.
Figure 9D:
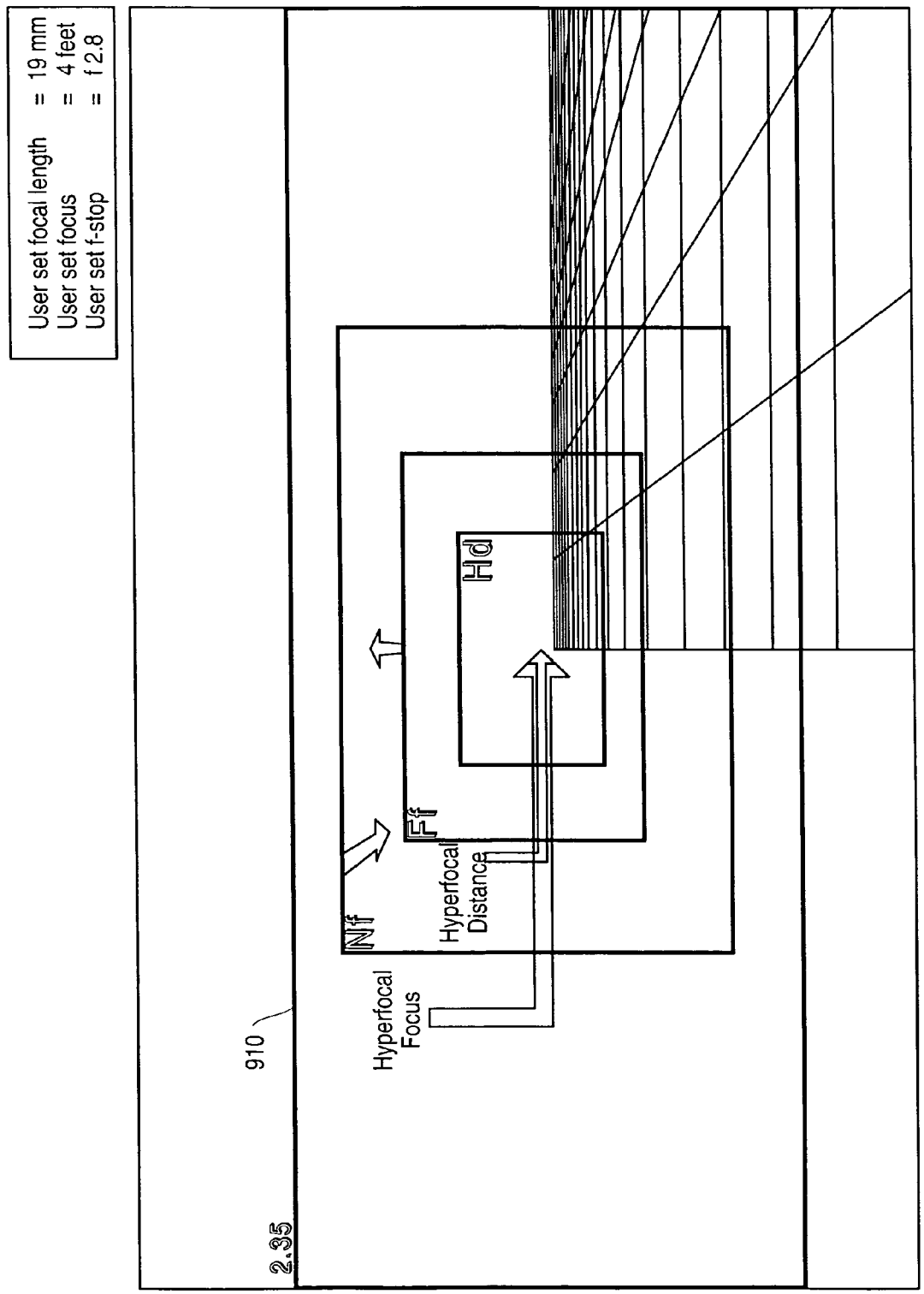
FIG. 9d is one embodiment of a camera view showing a 3D reference chart and objects without the superposed grid as illustrated in FIG. 9c.

FIG. 9*b* is a perspective view of the scene of FIG. 9*a*, showing the 3D reference chart 920, the near focus 940 and far focus 945, defining the field of view, and the hyperfocal distance 950. FIGS. 9*c* and 9*d* provide a camera view of the scene of FIG. 9*a*. In particular, FIG. 9*c* shows a 1.5 aspect ratio chart wherein the text marker is turned off and the Motion Picture Industry's standard 22 field chart (VISTAVISION) is substituted in the place of the 2.35 chart. FIG. 9*d* shows a 2.35 aspect ratio 3D reference chart 910.

Thus, it can be seen that the charts are interchangeable and follow the same rules of placement and orientation regardless of which chart is chosen.

Figure 10A:
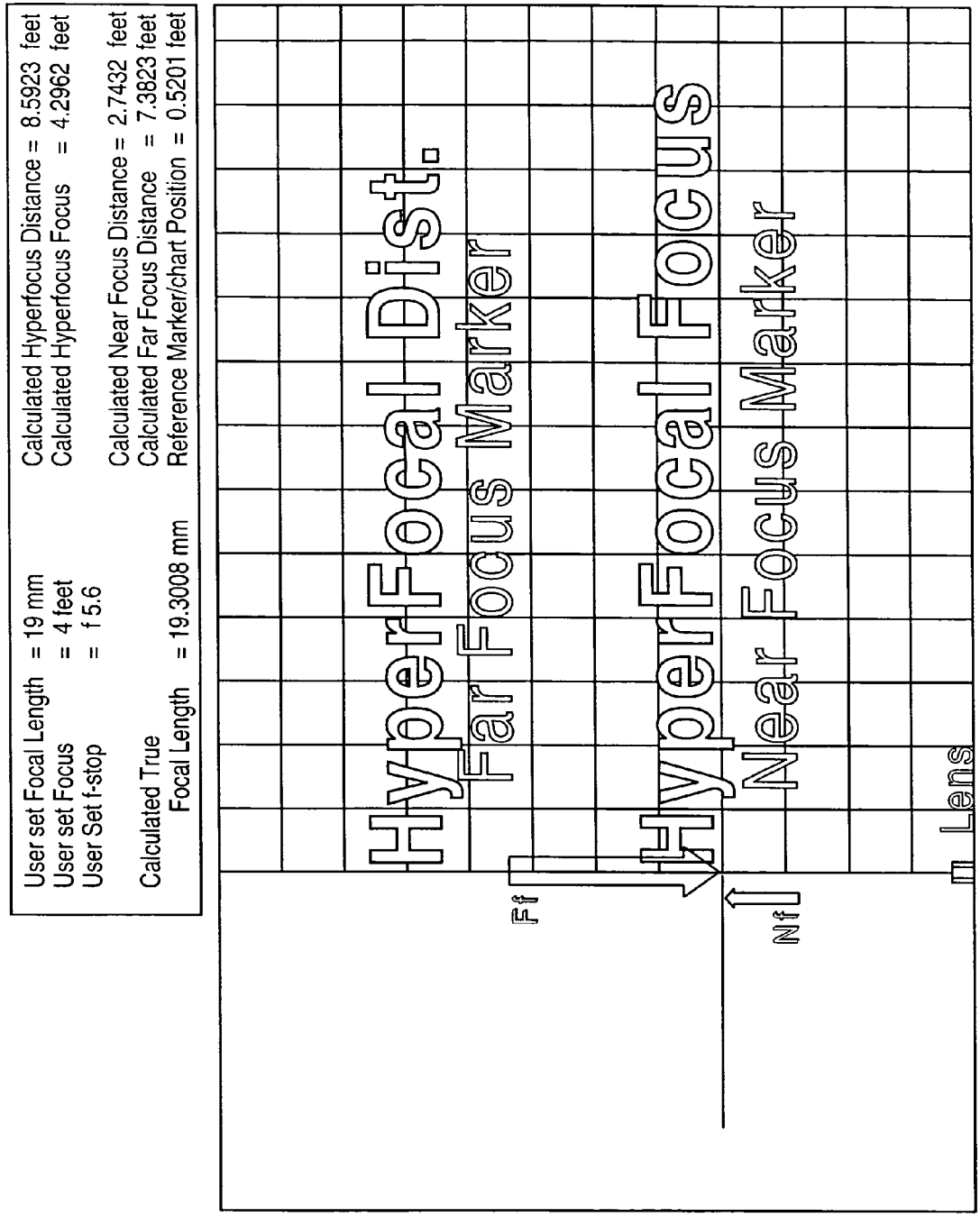
FIG. 10a shows a top view of an alternate embodiment of a display of camera and lens parameters in accordance with the teachings of the present invention.
Figure 10B:
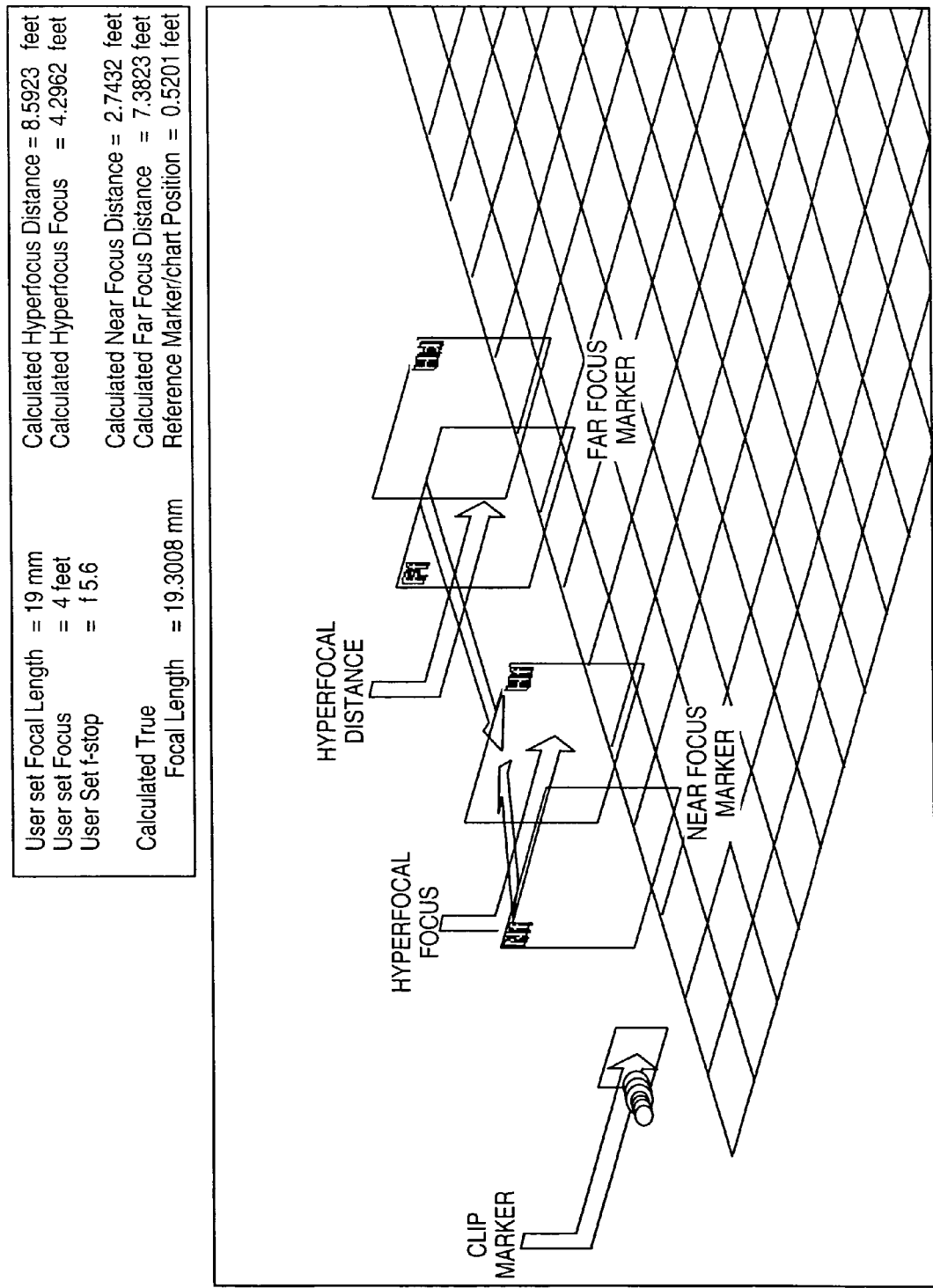
Figure 10C:
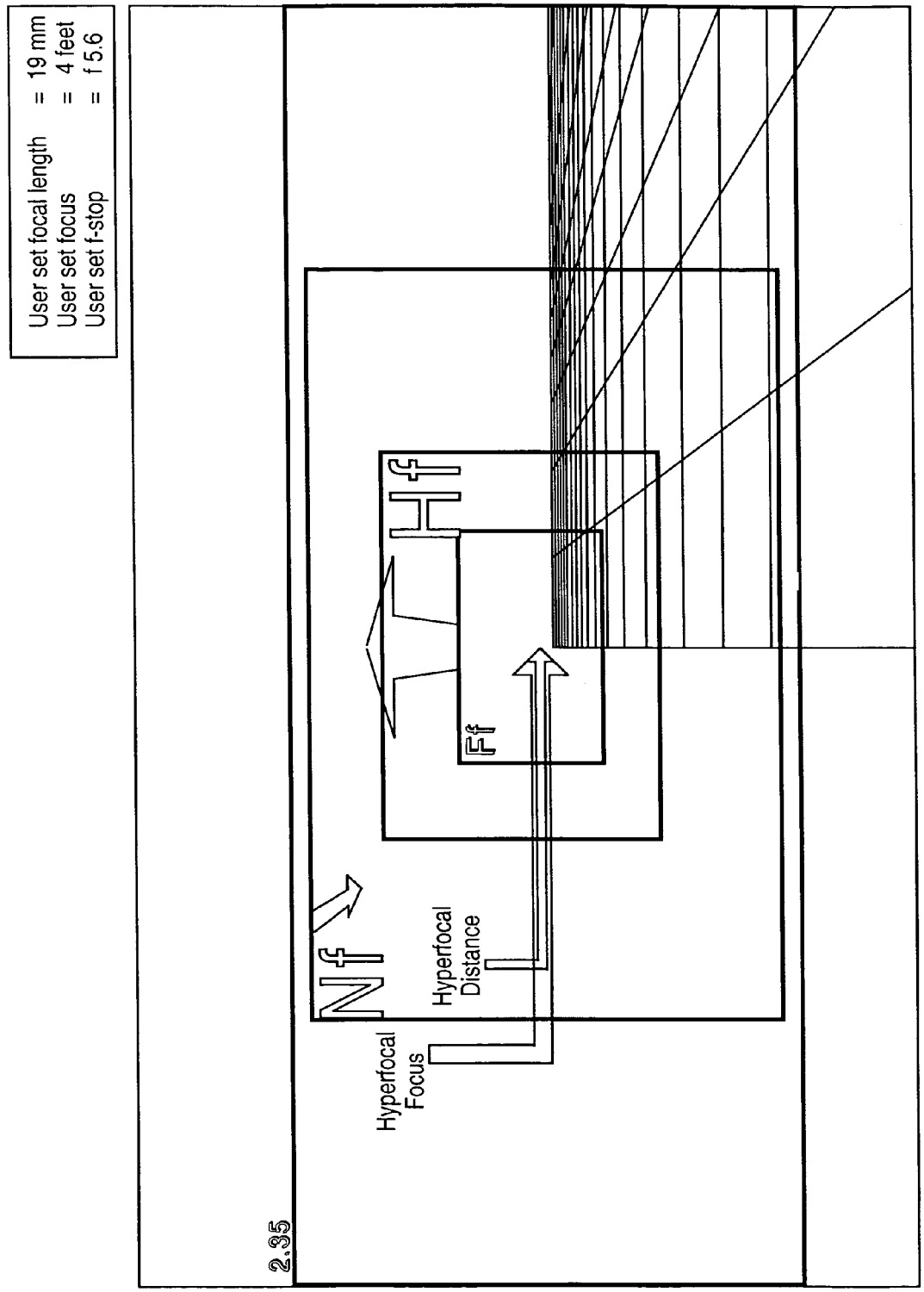
FIG. 10c shows a camera view of the camera and lens parameters in accordance with the teachings of the present invention.

FIGS. 10*a* through 10*c* illustrate a scene with the f-stop set to f5.6. Comparing FIGS. 10*a*-10*c* to 9*a*-9*c* it can be seen that the focal length has not changed and the reference chart position has not changed because the focal length has not changed. However, lens parameters based on the f-stop have changed. These include hyperfocal distance, hyperfocal focus, near focus and far focus. For example, by comparing FIGS. 10*c* and 9*c* it can be seen that the apparent size of the near focus marker in FIG. 9*c* occupies a much smaller part of the camera field of view than it does in FIG. 10*c*. This is because the near focus marker has been calculated to be much closer to the camera with a much larger f-stop in FIG. 10*c*. Similarly, the far focus marker is further away from the camera in FIG. 10*c* compared to FIG. 9*c*. These changes and values demonstrate several simultaneous changes in focus parameters as only one value has changed, in this case the f-stop.

FIGS. 11*a* through 11*d* illustrate the change in the focus distance. In this situation, the parameters are set to the same as shown in FIGS. 9*a* through 9*d*, but the focus has been changed from four feet to ten feet. Because the focus is changing, the focal length changes accordingly. In this situation, focusing further away from the camera results in a focal length that is slightly shorter; thus, the calculated true focal length equals 19.1192 mm, while at four feet it was 19.3008 mm. Visually, the difference can be seen by comparing FIG. 9*b* with FIG. 11*a*. FIG. 9*b* has a focus of four feet, and FIG. 11*a* has a focus of ten feet.

It should be noted that the hyperfocal distance and hyperfocal focus and the 3D reference marker position have only changed very slightly due to the very slight change in focal length from the affected focus. However, the positions of the near and far focus have changed dramatically due to the focus being set further away from the camera.

Figure 11A:
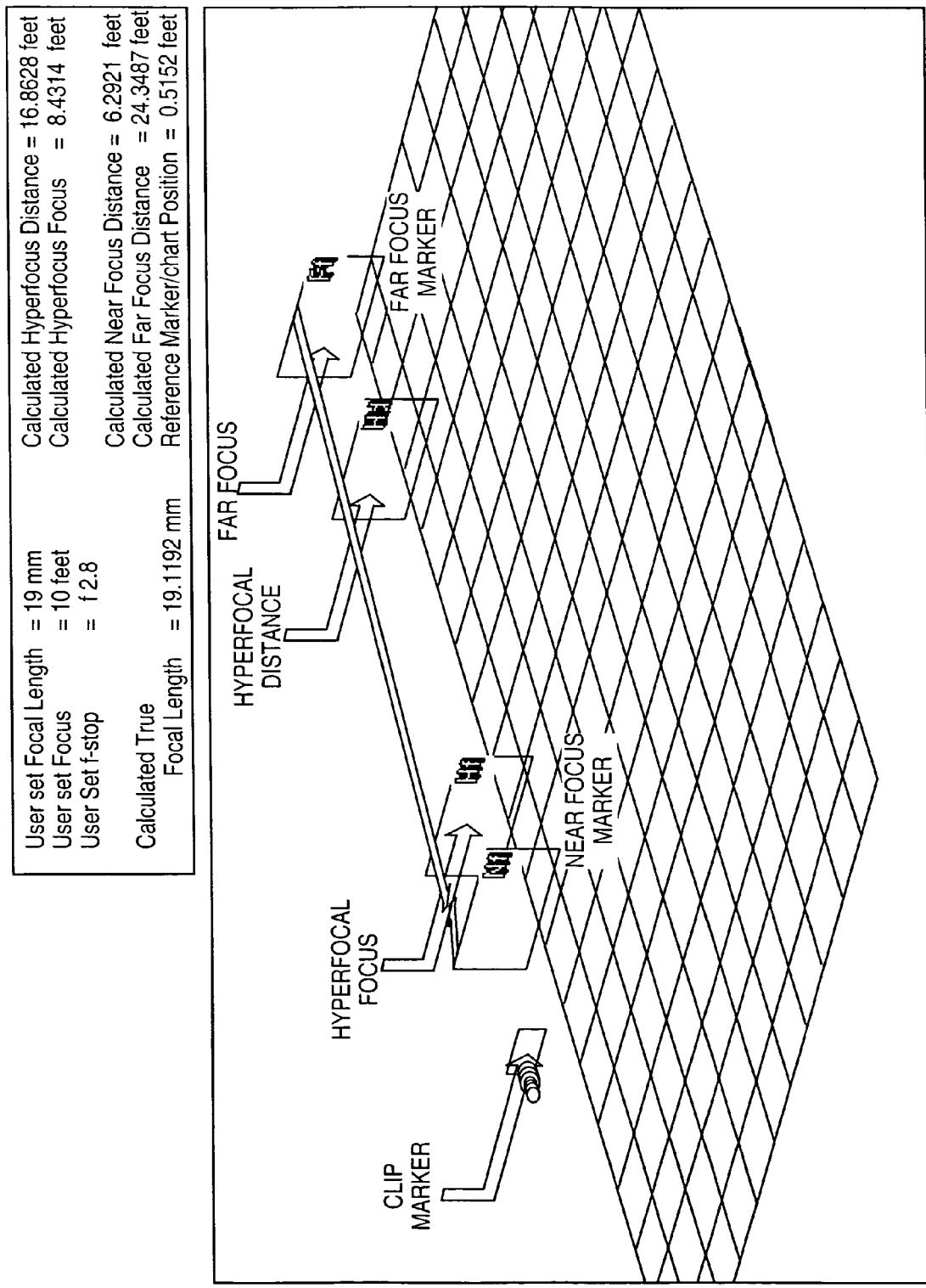
FIG. 11a shows an alternate embodiment of a display of camera and lens parameters in perspective in accordance with the teachings of the present invention.

In FIG. 11*a* the perspective view of the camera and lens markers have been moved back a significant amount in order to show the far focus marker being so far away from the camera. Also, it should be noted that in FIG. 11*a*, the arrows coming from the near focus marker and far focus marker still point to the same position space as the actual focus setting of ten feet. As noted earlier, these marker arrows expand in accordance with the positions of the tails set at the marker positions and the tips of the arrow stay at the user focus set point.

Figure 11B:
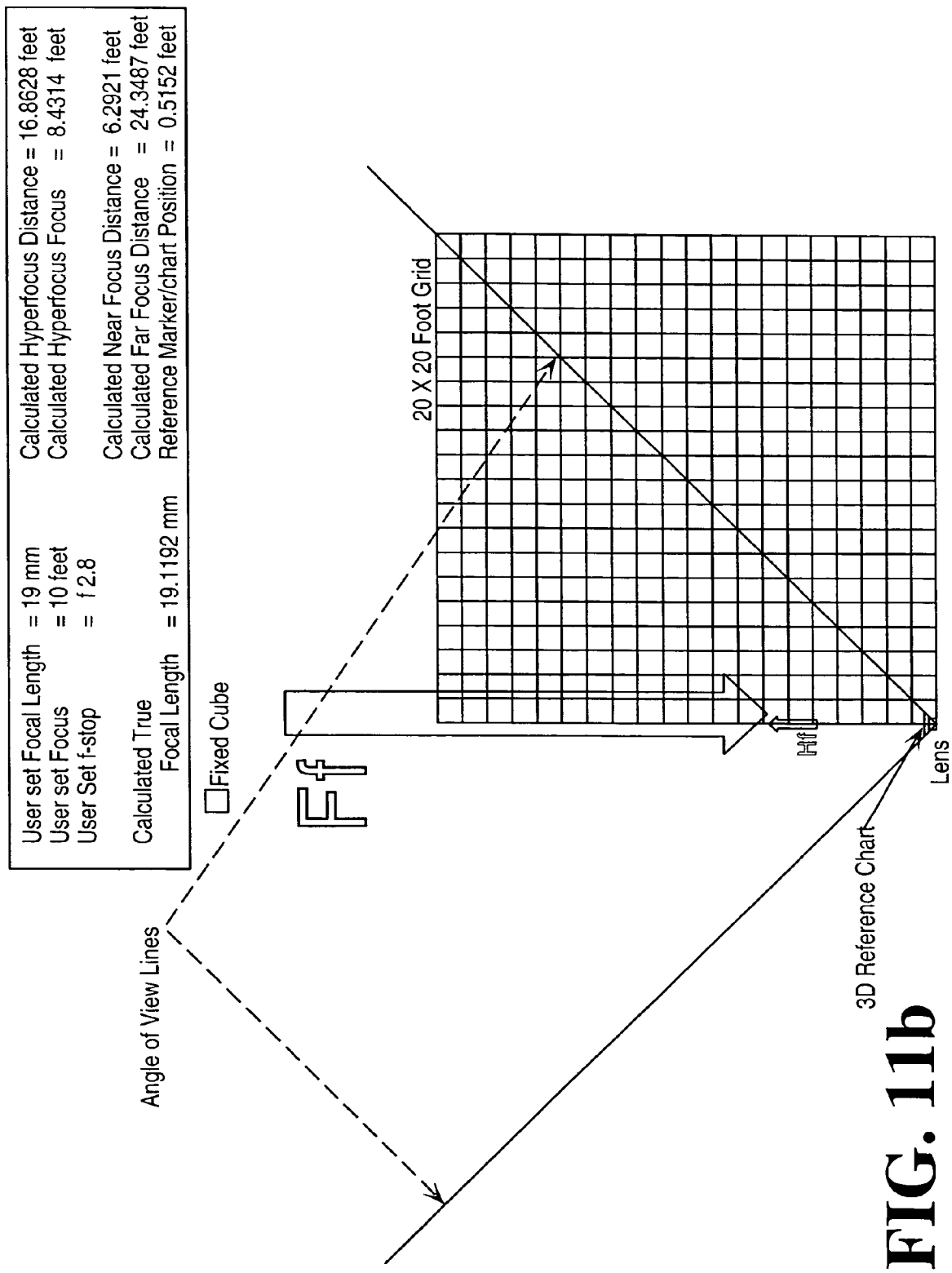
Figure 11C:
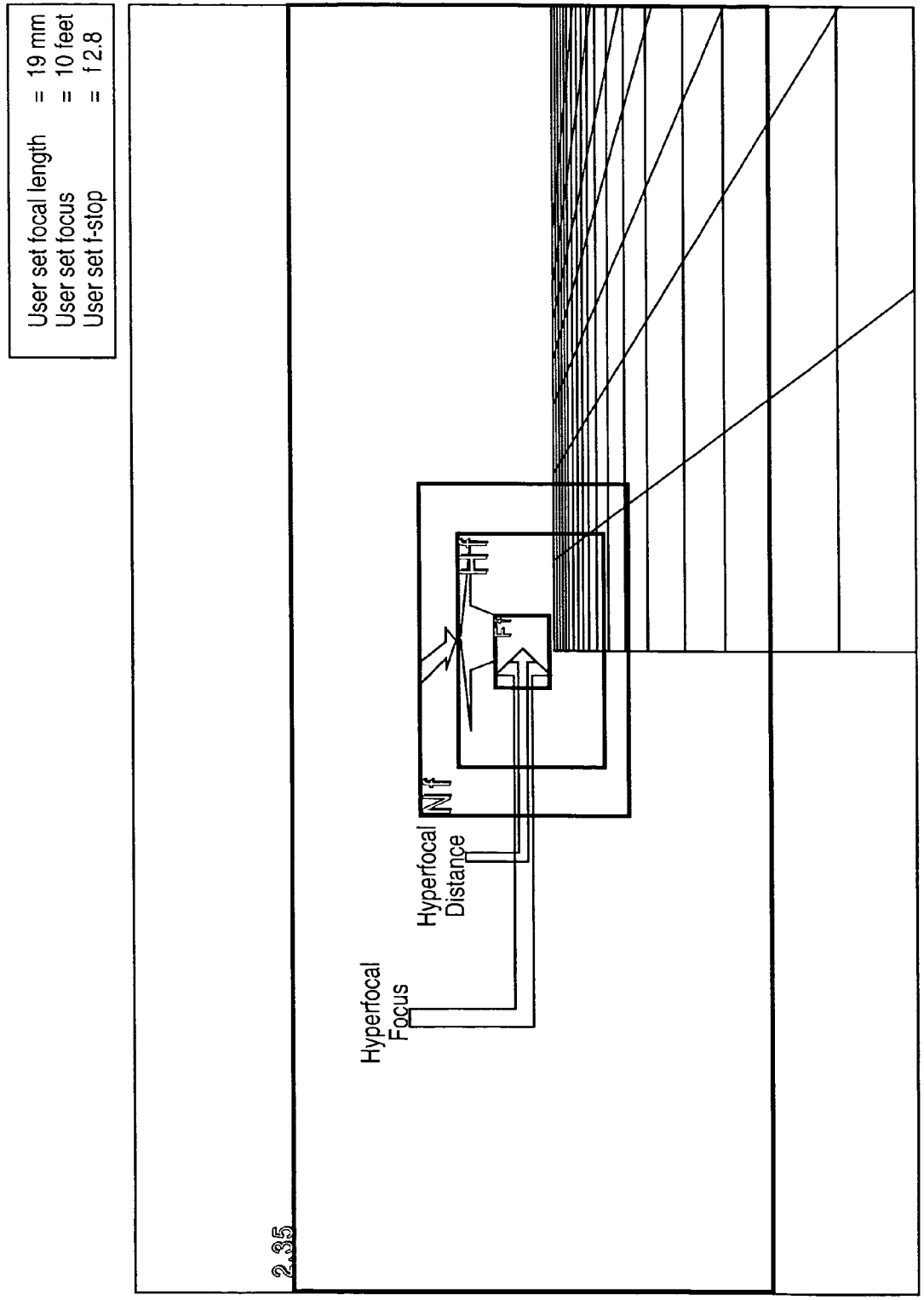

The changing angle of view can be seen by comparing FIGS. 9*a* and 11*b*. The angle of view change is slight; however, by comparing the location of the angle of view with respect to the grid in the two figures a slight change of position can be seen. The change is due to a very slight change of focal length between a four foot setting and a ten foot setting on a 19 mm lens. These types of changes, although very small, are what lead to problems in the prior art when attempting to align images when the focal length has not been correctly calculated to take into the account the effects of focus.

Figure 11D:
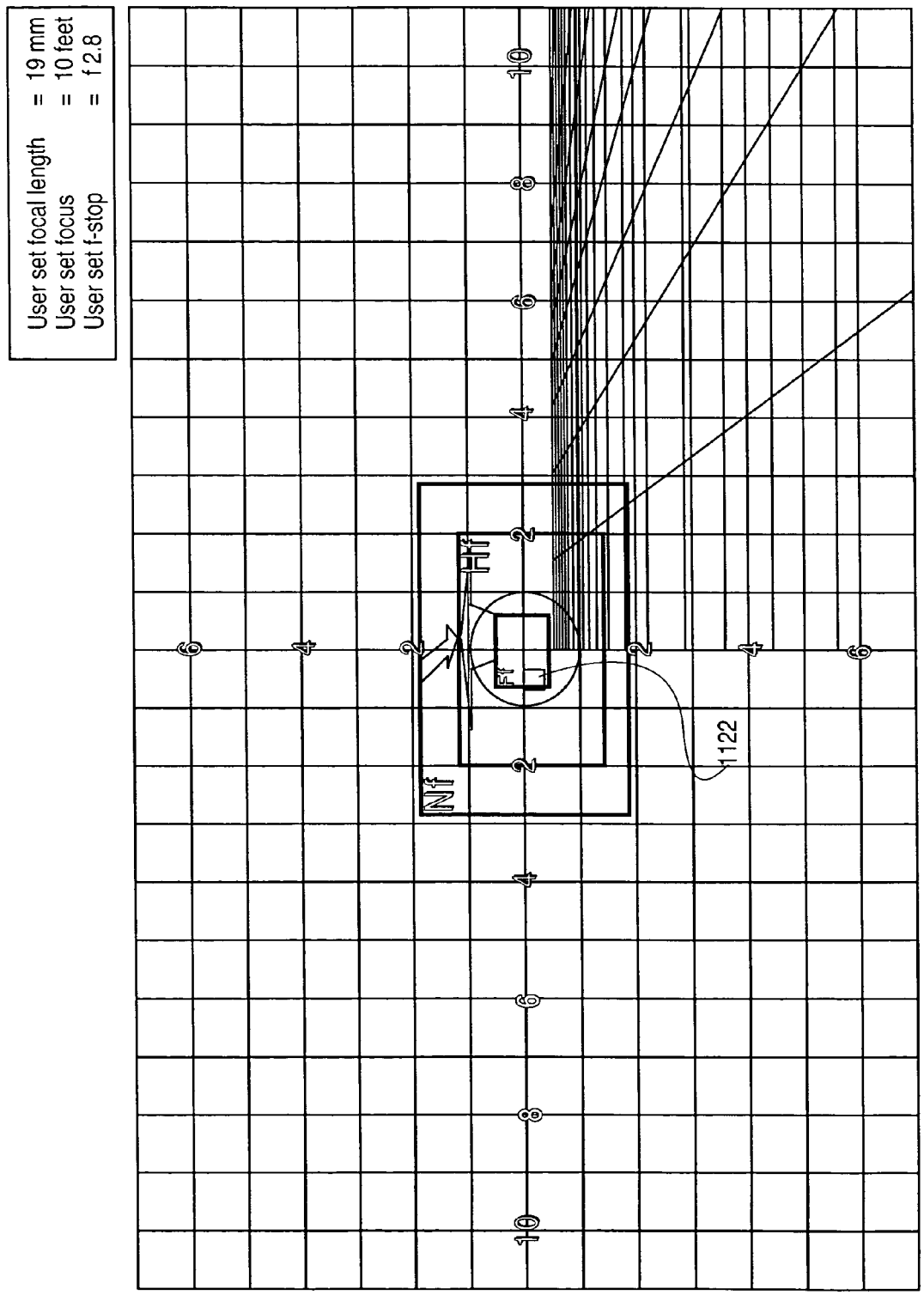
FIG. 11d shows the camera view of FIG. 11a including 3D reference chart, objects and a superposed grid.
Figure 12A:
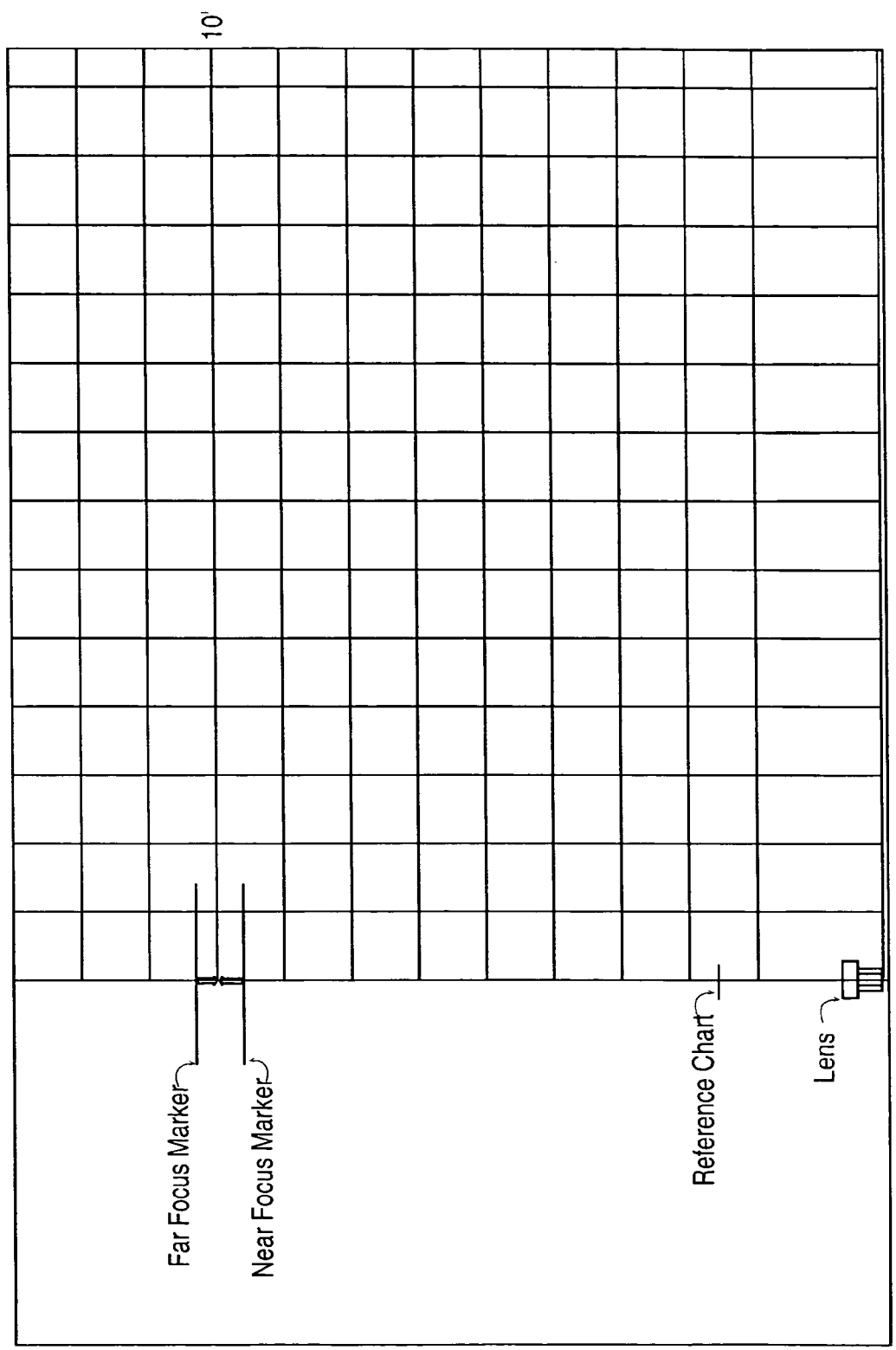
FIG. 12a is a top view of an alternate embodiment of a display of camera and lens parameters in accordance with the teachings of the system of the present invention.
Figure 12B:
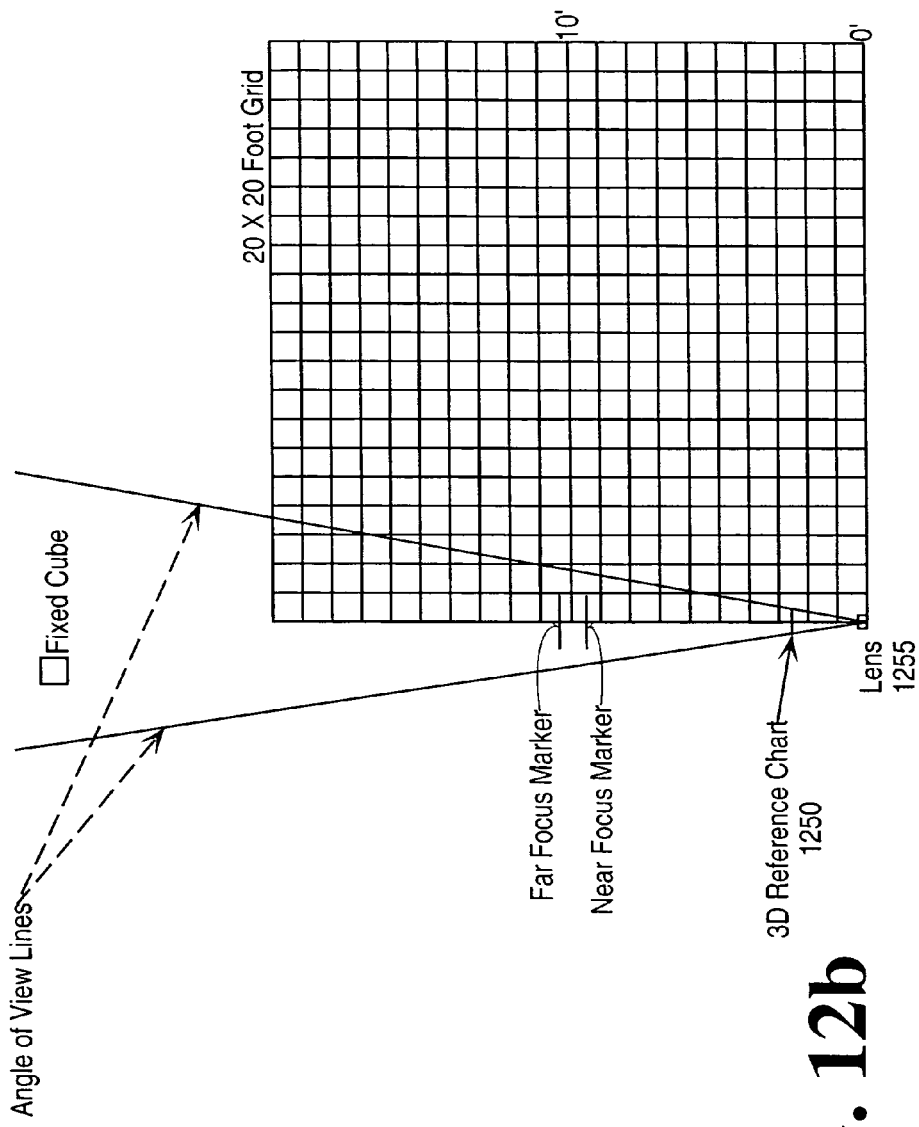
Figure 12C:
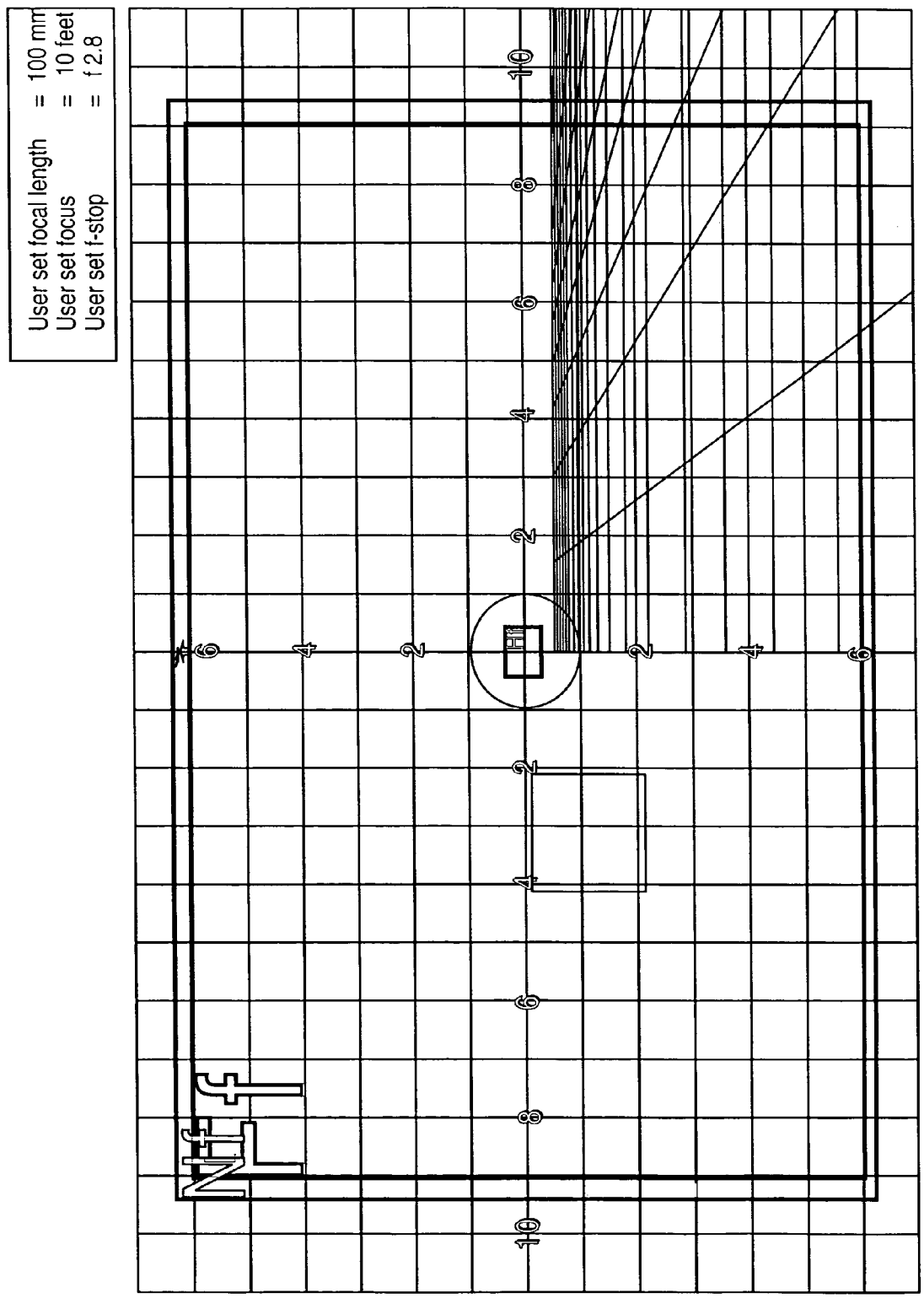
FIG. 12c is a camera view of FIG. 12a illustrating an object and reference chart.

FIGS. 12a through 12c show a different camera and lens setup in which a 100 mm lens is set to a ten foot focus and f-stop of F2.8. FIG. 12a is a top orthographic view. It can be seen that two arrows point exactly to the ten foot line on the grid. It should also be noticed that the 3D reference chart has been moved up to 2.7861 feet in front of the lens, whereas the position for the 19 mm lens setup (e.g., FIGS. 9a through 9d) was a little over a 0.5 feet. This is because the angle of view has become very narrow and to fit the angle of view exactly, the 3D reference chart must be pushed out further beyond the lens to correctly be represented in the camera field of view. This effect also can be seen referencing FIGS. 12b and 12c. In FIG. 12b, the 3D reference chart 1250 is far beyond the lens 1255. The near and far focus markers (not visible) are positioned approximately ten feet beyond the lens. Thus, referring to FIG. 12b it can be seen that the much longer focal length lens results in fixed cube 1265 becoming much larger in frame (row positioned roughly between the left "2" and "4" markers on the numbered grid) compared to the cube in FIG. 11d. The cube in FIG. 11d is the very small square 1122 to the left of the center zero mark; this illustrates the effects of the changing focal length.

Figure 13A:
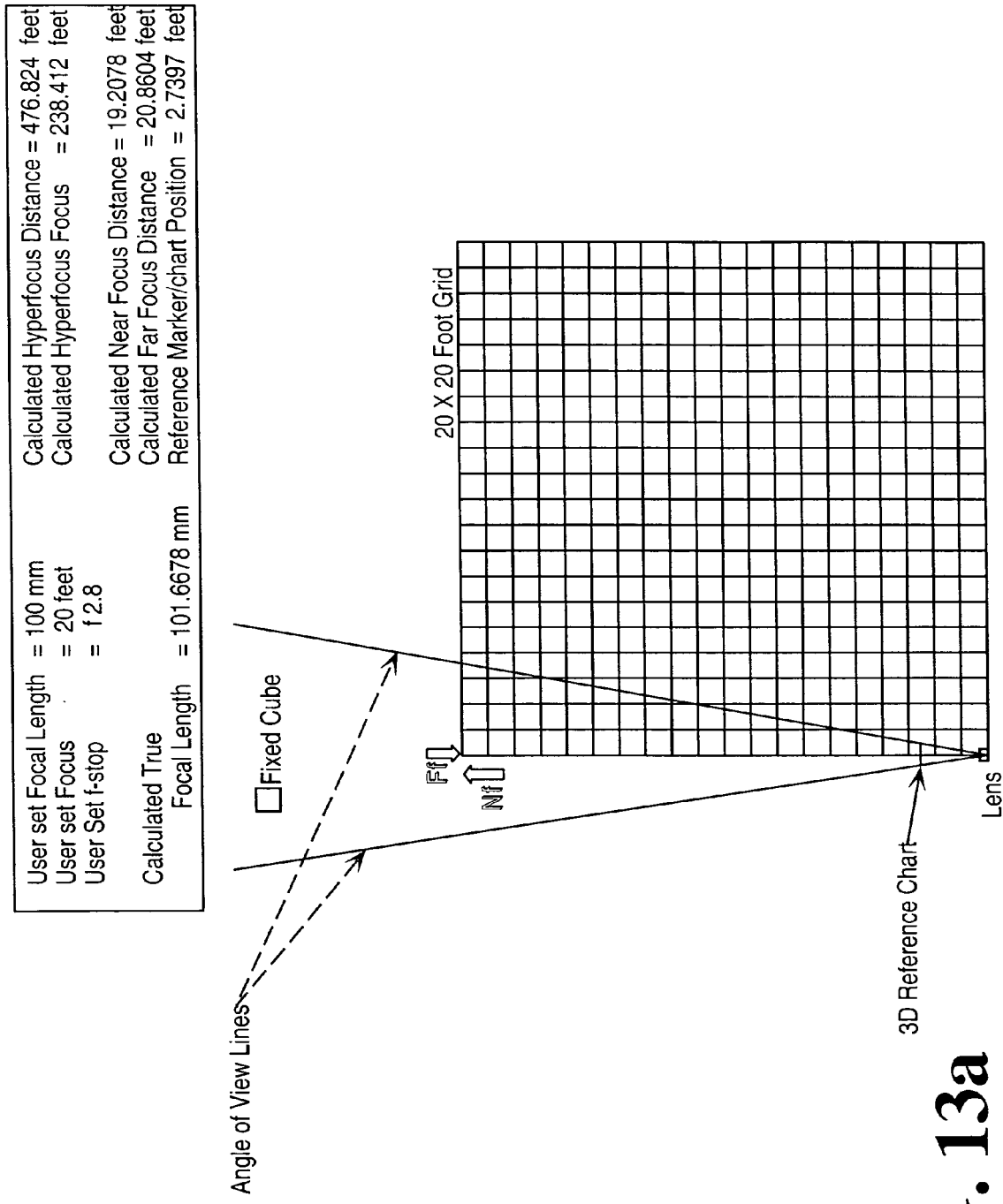
FIG. 13a is a top orthographic view illustrating an alternate embodiment of a display of a camera and lens field of view in accordance with the teachings of the present invention.
Figure 13B:
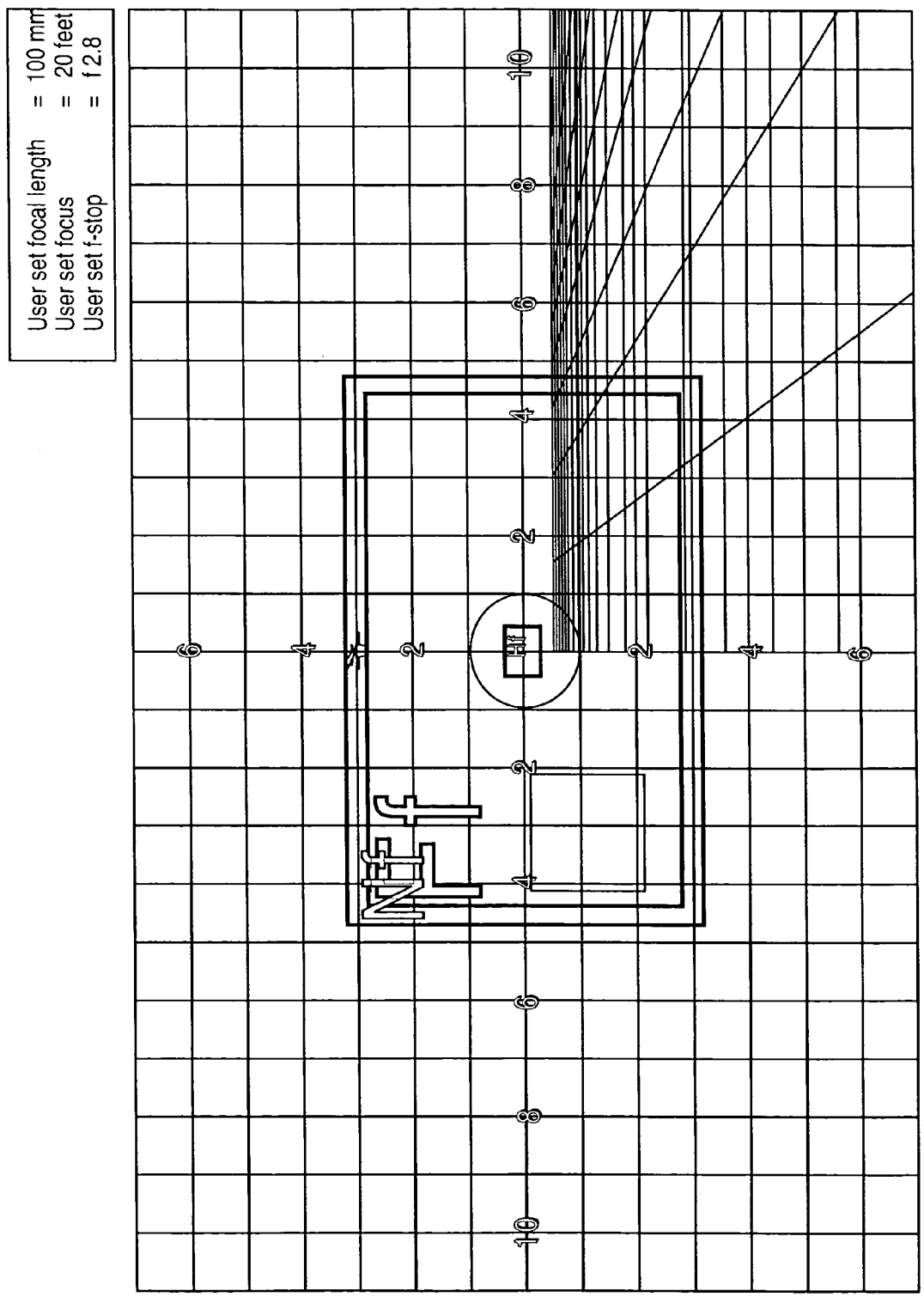
FIG. 13b is a camera view illustrating 3D reference chart and objects of FIG. 13a in accordance with the teachings of the present invention.

FIGS. 13a and 13b show the effect of changing the focus to twenty feet while keeping the other parameters the same. The near focus and far focus markers are positioned with the tips of the markers located at exactly twenty feet. The depth of view is barely one foot on either side. However, near focus and far focus markers appear very large in FIG. 13b. They are actually very far away as shown in FIG. 13a.

Figure 14A:
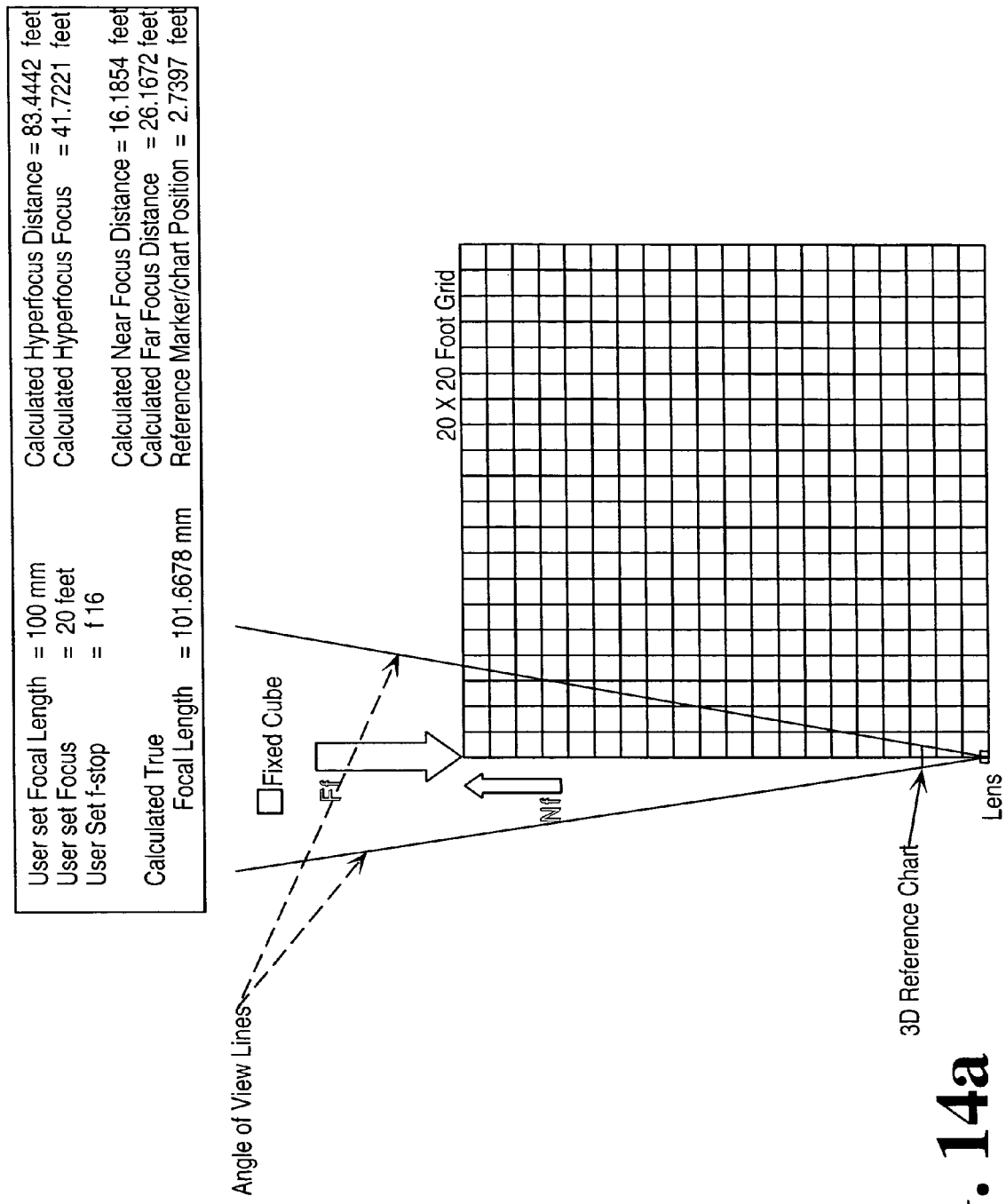
FIG. 14a is a top orthographic view showing the field of view in accordance with the teaching of the present invention.
Figure 14B:
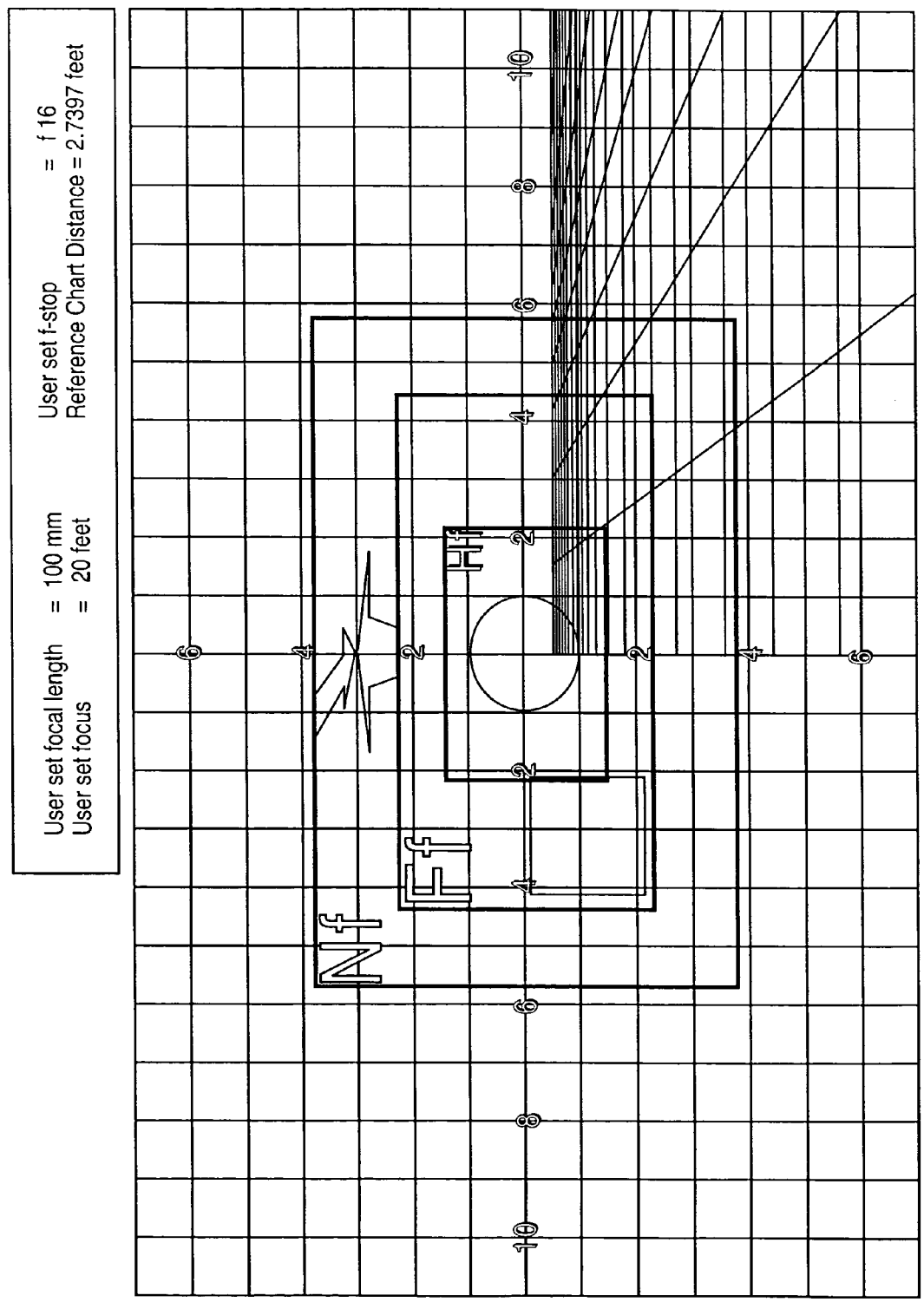
FIG. 14b is a camera view showing a reference chart and objects in accordance with the teachings of the present invention.

FIGS. 14a and 14b show the effect of changing the f-stop from f2.8 to f16. By increasing the f-stop to f16, the near and far focus are expanded much further away from each other resulting in a much greater depth of view. The arrows of the markers still point to the twenty foot mark which is a user set focus setting. As the f-stop is changed by the user, the lens parameters automatically are updated and positioned correctly. It should be recognized that throughout the examples shown, whenever a reference chart, such as the numbered grid, is seen through the camera, it usually appears absolutely the same regardless of the focal length or other changes, as if there were a fixed object attached to the camera eye piece aperture, just like a physical chart that is mechanically attached to a real world camera. As discussed above, the effect is achieved by calculating dynamically the reference chart position in order to reverse the effects of the changing focal length. Thus, the reference chart appears unchanging to the user and camera point of view while it is actually changing its position in the 3D world to simulate the static effect. Visually this effect is illustrated by comparing FIGS. 12c and 9c. Although the near focus and far focus and other markers are moving, the reference clip does not appear to change position in the camera point of view even though its position is drastically different.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for visualizing a rendering that will result from settings of a virtual camera and lens system in a three dimensional computer graphic modeling environment, the method comprising:

receiving a nominal focal length and a focus distance for the lens system of the virtual camera;

determining a true focal length for the lens system using the nominal focal length and the focus distance;

attaching an optical axis object that represents the optical axis of the virtual camera and lens system in the three dimensional computer graphic modeling environment to a virtual camera object;

attaching a marker object to the optical axis at a location determined by using the setting of the virtual camera and lens system and the true focal length;

displaying the marker object in the three dimensional computer graphic modeling environment to provide a visual aid for setting the virtual camera and lens system; and updating the location of the marker object on the optical axis responsive to changes in the true focal length resulting from changes in the nominal focal length, the focus distance, or both.

2. The method of claim 1 wherein the marker object represents one of a field of view, a hyperfocal distance, a hyperfocal focus, a near focus, a far focus, a clip, or a reference object.

3. The method of claim 1 wherein the true focal length is calculated according to the formula of $$TFL=FL+FL^2/(Fo-FL)$$

wherein TFL represents the true focal length, FL represents a nominal focal length, and Fo is a distance at which the lens is focused, with all values being lengths in consistent units of measurement.

4. The method of claim 1 wherein the setting of the virtual camera and lens system is one of a field of view or a clip, and the marker object is a rectangle having a width of Clip Width and a center that is attached perpendicularly to the optical axis at a distance of Clip Pos from the virtual camera and lens system, where Clip Pos is calculated according to the formula of $$\text{Clip Pos}=(TFL)*(\text{Clip Width}/Ap)$$

where TFL represents the true focal length, Clip Width represents the width of the clip, and Ap represents the width of the film gate aperture, with all values being lengths in consistent units of measurement.

5. The method of claim 1 wherein the setting of the virtual camera and lens system is a hyperfocal distance (Hd), and the marker object is attached to the optical axis at a distance of Hd from the virtual camera and lens system, where Hd is calculated according to the formula of $$Hd=(TFL^2)/(Fs*Coc)$$

where TFL represents the true focal length, Fs represents an f-stop, and Coc represents an acceptable diameter of a circle of confusion, with all values that are lengths being in consistent units of measurement.

6. The method of claim 1 wherein the setting of the virtual camera and lens system is a near focus (Nf) and the marker object is attached to the optical axis at a distance of Nf from the virtual camera and lens system, where Nf is calculated according to the formula of $$Nf=((TFL^2/(Fs*Coc))*Fo)/((TFL^2//(Fs*Coc))+(Fo-TFL))$$

where TFL represents the true focal length, Fs represents an f-stop, Coc represents an acceptable diameter of a circle of confusion, and Fo represent a focus distance, with all values that are lengths being in consistent units of measurement.

7. The method of claim 1 wherein the setting of the virtual camera and lens system is a far focus (Ff), and the marker object is attached to the optical axis at a distance of Ff from the virtual camera and lens system, where Ff is calculated according to the formula of $$Ff=(TFL^2/(Fs*Coc))*Fo)/((TFL^2/(Fs*Coc))+(Fo+TFL))$$

where TFL represents the true focal length, Fs represents an f-stop, Coc represents an acceptable diameter of a circle of confusion, and Fo represent a focus distance, with all values that are lengths being in consistent units of measurement.

8. The method of claim 1 wherein the setting of the virtual camera and lens system is a far focus (Ff), and the marker object is attached to the optical axis at a distance of final far focus (FinFf) from the virtual camera and lens system, the method further comprising:

receiving an infinity setting (Inf);

calculating Ff according to the formula of $$Ff=((TFL^2/(Fs*Coc))*Fo)/((TFL^2/Fs*Coc))+(Fo+TFL))$$

where TFL represents the true focal length, Fs represents an f-stop, Coc represents an acceptable diameter of a circle of confusion, and Fo represent a focus distance, with all values that are lengths being in consistent units of measurement;

and setting FinFf to Wif Ff is greater than Jnf, otherwise setting FinFf to Ff.

9. The method of claim 8 further comprising setting FinFf to Inf if Ff is greater than a hyperfocal focus (Hf).

10. The method of claim 1 further comprising:

setting a focal length parameter of the virtual camera object to the true focal length; and updating the focal length parameter of the virtual camera object responsive to changes in the focus distance.

11. A method for visualizing a rendering that will result from settings of a virtual camera and lens system in a three dimensional computer graphic modeling environment, the method comprising:

step for receiving a nominal focal length and a focus distance for the lens system of the virtual camera;

step for determining a true focal length for the lens system using the nominal focal length and the focus distance;

step for attaching an optical axis object that represents the optical axis of the virtual camera and lens system in the three dimensional computer graphic modeling environment to a virtual camera object;

step for attaching a marker object to the optical axis at a location determined by using the setting of the virtual camera and lens system and the true focal length;

step for displaying the marker object in the three dimensional computer graphic modeling environment to provide a visual aid for setting the virtual camera and lens system; and step for updating the location of the marker object on the optical axis responsive to changes in the nominal focal length, the focus distance, or both.

12. The method of claim 11 wherein the marker object represents one of a field of view, a hyperfocal distance, a hyperfocal focus, a near focus, a far focus, a clip, or a reference object.

13. The method of claim 12 further comprising:

step for setting a focal length parameter of the virtual camera object to the true focal length; and step for updating the focal length parameter of the virtual camera object responsive to changes in the focus distance.

* * * * *